United States Patent
Tachibana

(10) Patent No.: US 10,744,808 B2
(45) Date of Patent: Aug. 18, 2020

(54) PRINTING APPARATUS CAPABLE OF CONVEYING SHEETS TO SHEET PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yoshiro Tachibana, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/296,331

(22) Filed: Mar. 8, 2019

(65) Prior Publication Data

US 2019/0202226 A1 Jul. 4, 2019

Related U.S. Application Data

(63) Continuation of application No. 14/674,413, filed on Mar. 31, 2015, now Pat. No. 10,265,990.

(30) Foreign Application Priority Data

Apr. 2, 2014 (JP) .................................. 2014-076178

(51) Int. Cl.
*B42B 2/02* (2006.01)
*G03G 15/00* (2006.01)
(Continued)

(52) U.S. Cl.
CPC ................ *B42B 2/02* (2013.01); *B42C 19/02* (2013.01); *B65H 7/20* (2013.01); *B65H 31/02* (2013.01);
(Continued)

(58) Field of Classification Search
CPC ........ B42B 2/02; B42C 19/02; G03G 15/502; G03G 15/6541; G03G 15/6582;
(Continued)

(56) References Cited

U.S. PATENT DOCUMENTS

| | | | |
|---|---|---|---|
| 5,481,354 | A | 1/1996 | Nakajima |
| 5,592,280 | A | 1/1997 | Ishizuka et al. |

(Continued)

FOREIGN PATENT DOCUMENTS

| | | |
|---|---|---|
| CN | 101004669 A | 7/2007 |
| CN | 101780900 A | 7/2010 |

(Continued)

OTHER PUBLICATIONS

Office Action issued in Chinese Appln. No. 201310572283.2 dated Mar. 30, 2015. English translation provided.

(Continued)

*Primary Examiner* — Justin V Lewis
(74) *Attorney, Agent, or Firm* — Rossi, Kimms & McDowell LLP

(57) ABSTRACT

A printing apparatus capable of producing a product having the optimum image layout dependent on a discharge destination even when saddle-stitching is canceled due to input of image data for sheets in excess of a limit of a saddle-stitchable number of sheets. The number of output sheets per one copy is calculated based on image data. When the number of output sheets per one copy exceeds a saddle-stitchable number of sheets, it is selected whether to perform the center folding processing on the sheets on which images are printed without performing the saddle stitching processing thereon or to perform neither the saddle stitching processing nor the center folding processing on the sheets on which images are printed.

14 Claims, 25 Drawing Sheets

(51) Int. Cl.

| | | |
|---|---|---|
| *B42C 19/02* | (2006.01) | |
| *B65H 39/10* | (2006.01) | |
| *B65H 37/04* | (2006.01) | |
| *B65H 43/00* | (2006.01) | |
| *B65H 7/20* | (2006.01) | |
| *B65H 37/06* | (2006.01) | |
| *B65H 31/02* | (2006.01) | |
| *G06F 3/12* | (2006.01) | |

(52) U.S. Cl.
CPC .............. *B65H 37/04* (2013.01); *B65H 37/06* (2013.01); *B65H 39/10* (2013.01); *B65H 43/00* (2013.01); *G03G 15/502* (2013.01); *G03G 15/6541* (2013.01); *G03G 15/6582* (2013.01); *B65H 2301/163* (2013.01); *B65H 2301/166* (2013.01); *B65H 2301/4213* (2013.01); *B65H 2301/42146* (2013.01); *B65H 2301/431* (2013.01); *B65H 2511/30* (2013.01); *B65H 2511/415* (2013.01); *B65H 2513/512* (2013.01); *B65H 2801/27* (2013.01); *B65H 2801/48* (2013.01); *G03G 2215/00831* (2013.01); *G03G 2215/00877* (2013.01); *G06F 3/125* (2013.01); *G06F 3/1208* (2013.01); *G06F 3/1258* (2013.01)

(58) Field of Classification Search
CPC ........ B65H 39/10; B65H 31/02; B65H 37/06; B65H 37/04; B65H 7/20
USPC ............................... 412/9, 11, 14, 18, 20, 33
See application file for complete search history.

(56) References Cited

U.S. PATENT DOCUMENTS

| | | | |
|---|---|---|---|
| 5,722,031 | A | 2/1998 | Fujii et al. |
| 8,672,312 | B2 | 3/2014 | Nonaka |
| 8,693,026 | B2 | 4/2014 | Takahashi |
| 2001/0016124 | A1 | 8/2001 | Shiramura |
| 2004/0256783 | A1 | 12/2004 | Iida et al. |
| 2005/0232656 | A1 | 10/2005 | Asai et al. |
| 2007/0017397 | A1 | 1/2007 | Kamata et al. |
| 2008/0154426 | A1* | 6/2008 | Kikuchi ................. B65H 31/24 700/219 |
| 2008/0170262 | A1 | 7/2008 | Takahashi |
| 2008/0211158 | A1 | 9/2008 | Fukasawa et al. |
| 2010/0183405 | A1 | 7/2010 | Nonaka |
| 2011/0242555 | A1 | 10/2011 | Nakajima |
| 2011/0280643 | A1 | 11/2011 | Matsumoto et al. |
| 2012/0038942 | A1 | 2/2012 | Umetsu |
| 2012/0069367 | A1 | 3/2012 | Iguchi |
| 2014/0023418 | A1 | 1/2014 | Kashiwagi et al. |
| 2014/0140747 | A1 | 5/2014 | Osada |
| 2015/0310316 | A1 | 10/2015 | Osada et al. |
| 2016/0214828 | A1 | 7/2016 | Osada et al. |
| 2018/0001689 | A1 | 1/2018 | Tachibana |

FOREIGN PATENT DOCUMENTS

| | | |
|---|---|---|
| CN | 102411293 A | 4/2012 |
| GB | 2288793 A | 11/1995 |
| JP | H0836328 A | 2/1996 |
| JP | 2002331730 A | 11/2002 |
| JP | 2005007597 A | 1/2005 |
| JP | 2005142609 A | 6/2005 |
| JP | 2005238757 A | 9/2005 |
| JP | 2008169030 A | 7/2008 |
| JP | 2008184324 A | 8/2008 |
| JP | 2008184325 A | 8/2008 |
| JP | 2008184326 A | 8/2008 |
| JP | 2008268603 A | 11/2008 |
| JP | 2010168134 A | 8/2010 |
| JP | 2010204679 A | 9/2010 |

OTHER PUBLICATIONS

Office Action issued in Japanese Application No. 2012-249426 dated Aug. 23, 2016.
Office Action issued in U.S. Appl. No. 14/078,606 dated Oct. 6, 2016.
Notice of Allowance issued in U.S. Appl. No. 14/078,606 dated Jun. 15, 2017.
Office Action issued in U.S. Appl. No. 15/701,932 dated Oct. 5, 2017.
Notice of Allowance issued in U.S. Appl. No. 15/701,932 dated Jun. 5, 2018.
Notice of Allowance issued in U.S. Appl. No. 15/701,932 dated Sep. 25, 2018.
Office Action issued in Japanese Application No. 2017-198660 dated Jun. 19, 2018.
Office Action issued in Japanese Appln. No. 2014-076178 dated Feb. 27, 2018.
Office Action issued in U.S. Appl. No. 14/674,413 dated Aug. 24, 2016.
Office Action issued in U.S. Appl. No. 14/674,413 dated Apr. 13, 2017.
Office Action issued in U.S. Appl. No. 14/674,413 dated Nov. 17, 2017.
Office Action issued in U.S. Appl. No. 14/674,413 dated Jul. 12, 2018.
Notice of Allowance issued in U.S. Appl. No. 14/674,413 dated Dec. 11, 2018.
Office Action issued in U.S. Appl. No. 16/229,051 dated Feb. 25, 2019.
Copending U.S. Appl. No. 16/229,051, filed Dec. 21, 2018 (a copy is not included because the cited application is not yet available to the public and the Examiner has ready access to the cited application).
Notice of Allowance issued in U.S. Appl. No. 16/229,051 dated Sep. 6, 2019.
Office Action issued in Japanese Application No. 2018-189187 dated Oct. 8, 2019.
Notice of Allowance issued in U.S. Appl. No. 16/229,051 dated Dec. 27, 2019.

\* cited by examiner

FIG. 9A

BOOKBINDING: ORIGINAL SIZE SELECTION

- A/B SIZE

| A4 | B4 |
| A4R | B5 |
| A3 | B5R |
| A5 | |
| A5R | |
| A6R | |

▶ DOUBLE-SIDED ORIGINAL

☐ POSTCARD

TO INCH SIZE ▶

CANCEL SETTING  ◀ RETURN  NEXT ▶  — 901

☰ SYSTEM STATUS/STOP ▶

FIG. 9B

BOOKBINDING: FINISHING SETTING

LEFT-OPENING    RIGHT-OPENING

CANCEL SETTING  ◀ RETURN  NEXT ▶  — 902

☰ SYSTEM STATUS/STOP ▶

FIG. 14A
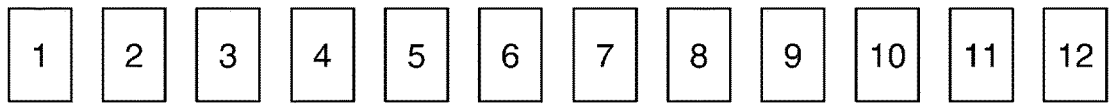
ORIGINALS
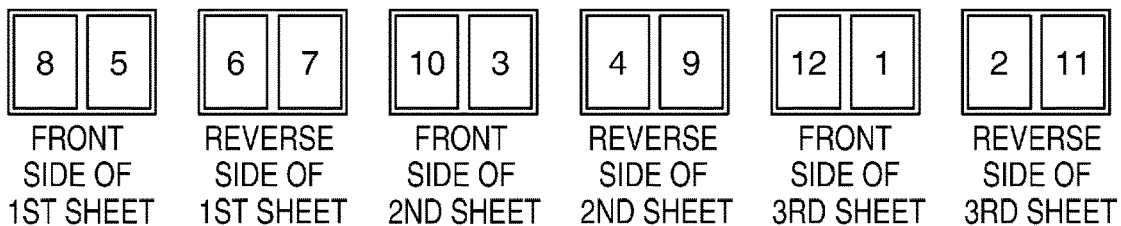
LAID OUT IMAGES
| FRONT SIDE OF 1ST SHEET | REVERSE SIDE OF 1ST SHEET | FRONT SIDE OF 2ND SHEET | REVERSE SIDE OF 2ND SHEET | FRONT SIDE OF 3RD SHEET | REVERSE SIDE OF 3RD SHEET |
FIG. 14B
RESULT OF PRINTING (BEFORE SWITCHBACK CONTROL)
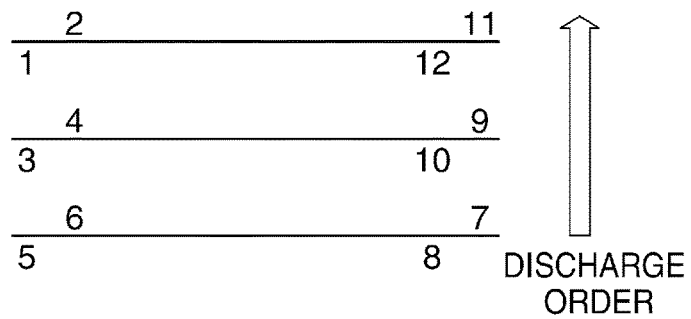
DISCHARGE ORDER
FIG. 14C
RESULT OF PRINTING (AFTER SADDLE-STITCHING)
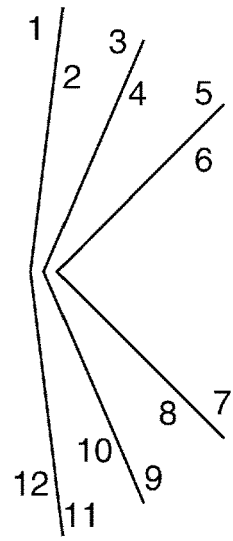

FIG. 15

ORIGINALS 1501

| 1 | 2 | 3 | 4 | 5 | 6 | 7 | 8 | 9 | 10 | 11 | 12 |
| 13 | 14 | 15 | 16 | 17 | 18 | 19 | 20 | 21 | 22 | 23 | 24 |
| 25 | 26 | 27 | 28 | 29 | 30 | 31 | 32 | 33 | 34 | 35 | 36 |
| 37 | 38 | 39 | 40 |

LAID OUT IMAGES 1502

| 22 19 | 20 21 | 24 17 | 18 23 | 26 15 | 16 25 |
|---|---|---|---|---|---|
| FRONT SIDE OF 1ST SHEET | REVERSE SIDE OF 1ST SHEET | FRONT SIDE OF 2ND SHEET | REVERSE SIDE OF 2ND SHEET | FRONT SIDE OF 3RD SHEET | REVERSE SIDE OF 3RD SHEET |
| 28 13 | 14 27 | 30 11 | 12 29 | 32 9 | 10 31 |
| FRONT SIDE OF 4TH SHEET | REVERSE SIDE OF 4TH SHEET | FRONT SIDE OF 5TH SHEET | REVERSE SIDE OF 5TH SHEET | FRONT SIDE OF 6TH SHEET | REVERSE SIDE OF 6TH SHEET |
| 34 7 | 8 33 | 36 5 | 6 35 | 38 3 | 4 37 |
| FRONT SIDE OF 7TH SHEET | REVERSE SIDE OF 7TH SHEET | FRONT SIDE OF 8TH SHEET | REVERSE SIDE OF 8TH SHEET | FRONT SIDE OF 9TH SHEET | REVERSE SIDE OF 9TH SHEET |
| 40 1 | 2 39 | | | | |
| FRONT SIDE OF 10TH SHEET | REVERSE SIDE OF 10TH SHEET | | | | |

RESULT OF PRINTING (BEFORE SWITCHBACK CONTROL)

DISCHARGE ORDER

RESULT OF PRINTING (AFTER CENTER FOLDING)

INSERT BUNDLE AT CENTER SO AS TO BE SANDWICHED

SUBSEQUENTLY DISCHARGED BUNDLE OF RECORDING SHEETS

PRECEDINGLY DISCHARGED BUNDLE OF RECORDING SHEETS

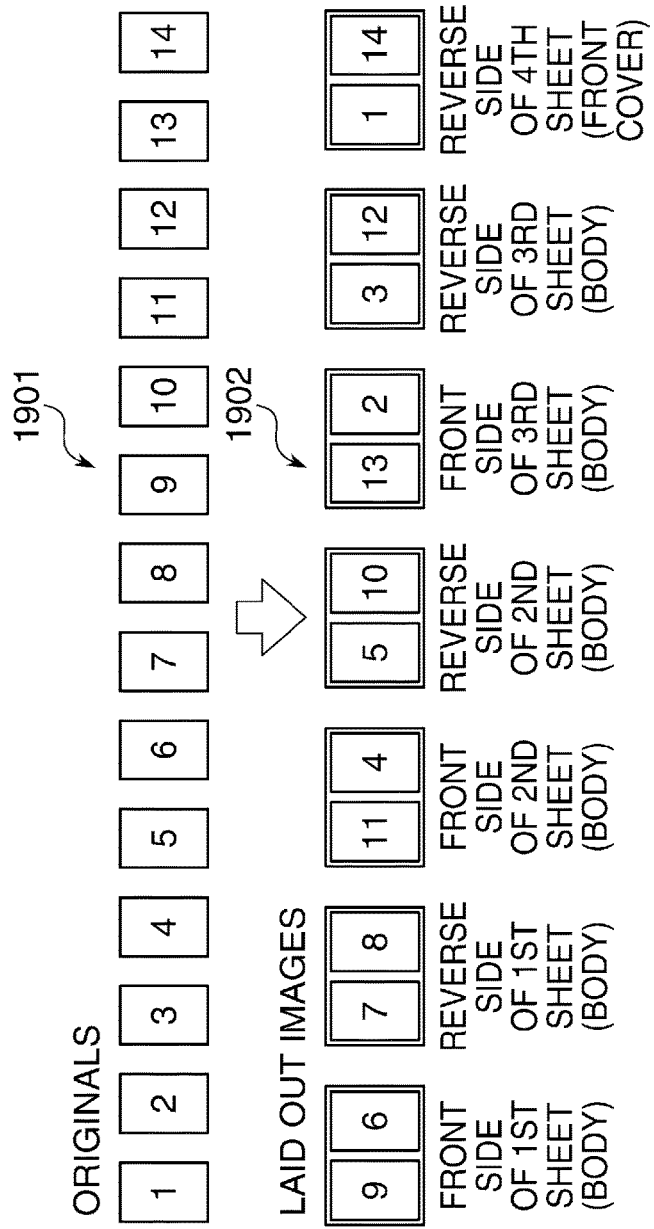
FIG. 19A
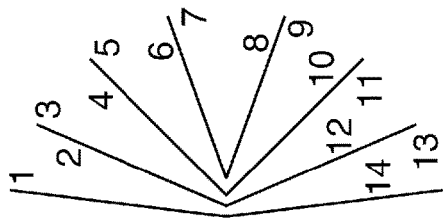
FIG. 19B RESULT OF PRINTING (BEFORE SWITCHBACK CONTROL)
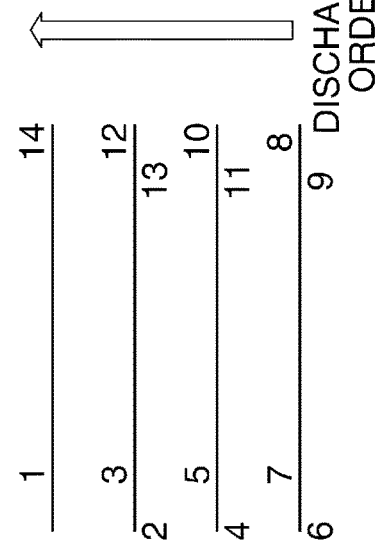
FIG. 19C RESULT OF PRINTING (AFTER SADDLE-STITCHING)

FIG. 20
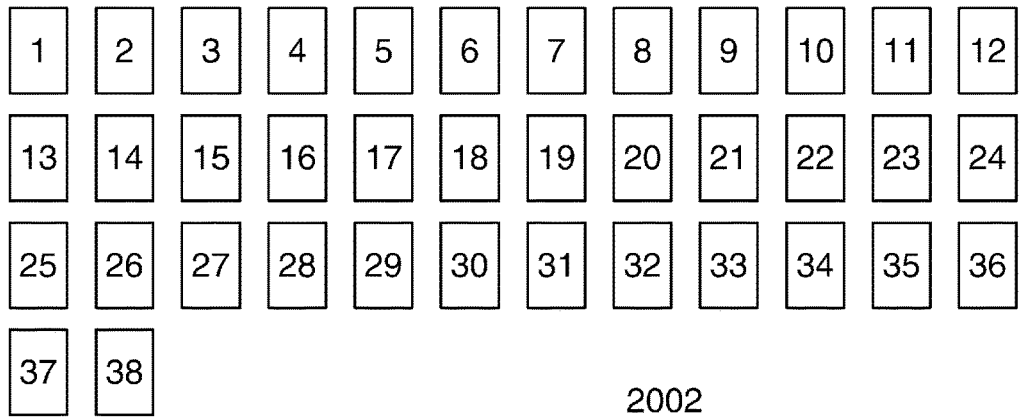
ORIGINALS — 2001
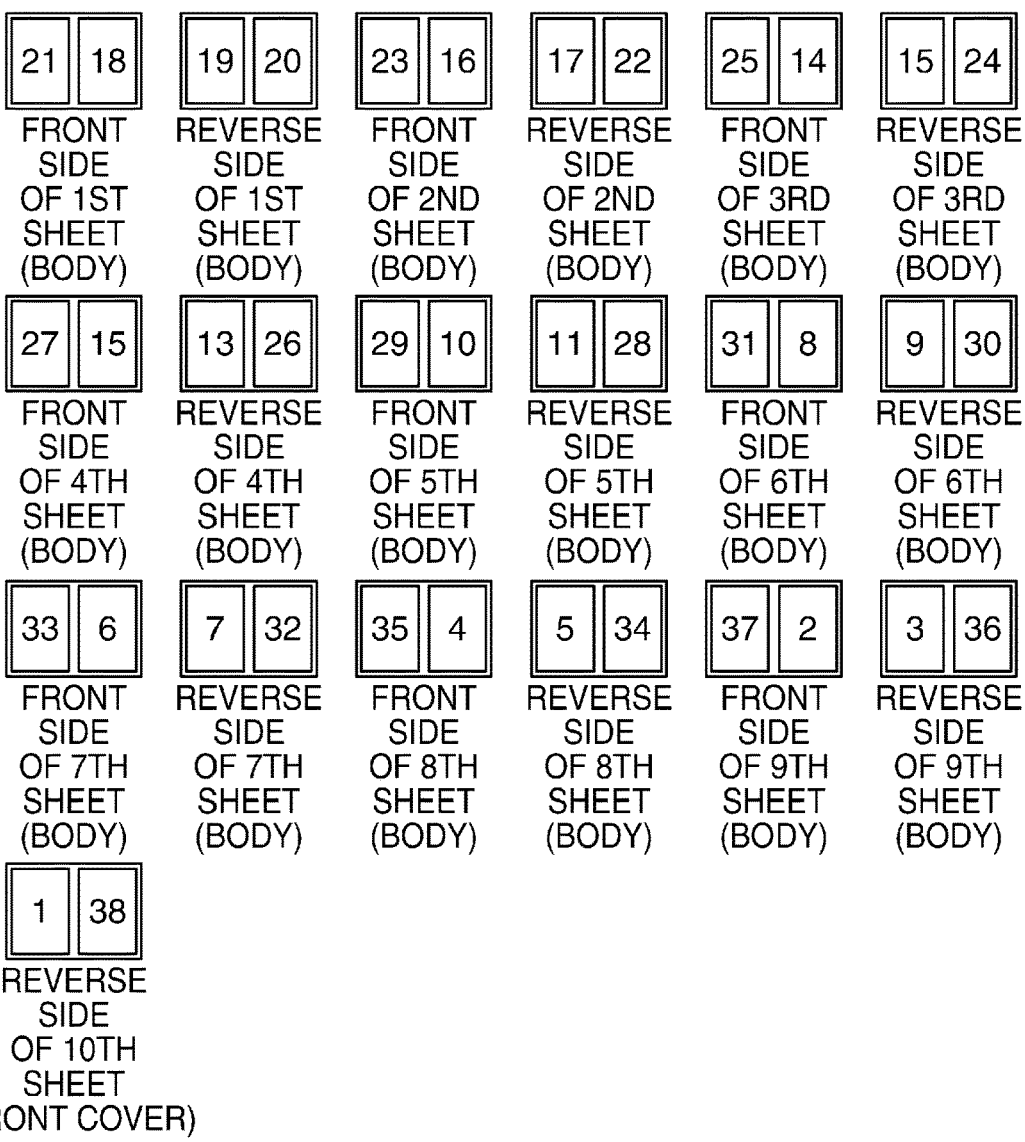
LAID OUT IMAGES — 2002

RESULT OF PRINTING (BEFORE SWITCHBACK CONTROL)

RESULT OF PRINTING (AFTER CENTER FOLDING)

INSERT BUNDLE AT CENTER SO AS TO BE SANDWICHED

SUBSEQUENTLY DISCHARGED BUNDLE OF RECORDING SHEETS

PRECEDINGLY DISCHARGED BUNDLE OF RECORDING SHEETS

PRINTING APPARATUS CAPABLE OF CONVEYING SHEETS TO SHEET PROCESSING APPARATUS, METHOD OF CONTROLLING THE SAME, AND STORAGE MEDIUM

BACKGROUND OF THE INVENTION

Field of the Invention

The present invention relates to a printing apparatus capable of conveying sheets to a sheet processing apparatus, a method of controlling the same, and a storage medium.

Description of the Related Art

Conventionally, there has been known a sheet processing apparatus that performs saddle stitching in which after stapling the center of a plurality of sheets, the stapled sheets is folded into two to thereby output the sheets in a booklet form (see Japanese Patent Laid-Open Publication No. 2010-168134). In the sheet processing apparatus, as shown in FIG. 23, sheets conveyed from an image forming apparatus are discharged onto one of stacking trays 101 and 102 and a saddle-stitched product tray 103 according to the type of a finishing process set by a user. For example, when no finishing process is to be performed, the sheets are discharged onto the stacking tray 101. When normal stapling is to be performed, the sheets are discharged onto the stacking tray 102, whereas when saddle stitching is to be performed, the sheets are discharged onto the saddle-stitched product tray 103.

Further, there has also been proposed a sheet processing apparatus constructed as shown in FIG. 23 such that a conveying path for performing stapling and a conveying path for performing saddle stitching are made at least partially common, thereby achieving downsizing of the apparatus. For example, this apparatus employs a method in which when performing the saddle stitching, a sheet introduced into the conveying path, denoted by reference numeral 104, for performing stapling is switched back by reverse rotation of a conveying roller pair 106, and is guided into the conveying path, denoted by reference numeral 105, for performing saddle stitching.

By the way, due to the mechanical limitation of the sheet processing apparatus, there is a limit to the number of sheets on which the apparatus can perform saddle stitching. Conventionally, in view of a case of input of image data for sheets in excess of the number that can be saddle-stitched, there has also been proposed an image processing apparatus configured to automatically change a discharge destination of sheets from the sheet processing apparatus, to thereby prevent the sheets from being conveyed to a saddle stitching section (see Japanese Patent Laid-Open Publication No. 2002-331730).

However, in the sheet processing apparatus constructed as shown in FIG. 23, when image data for sheets in excess of the number that can be saddle-stitched is input, if the discharge destination is automatically changed from the saddle-stitched product tray to the stacking tray, it is impossible to obtain a product intended by the user.

Further, when post processing offline is performed after completing only discharge of the sheets of a product onto the stacking tray even though the product is not as intended by the user, if the sheets printed with an image layout intended for discharge onto the saddle-stitched product tray are discharged onto the stacking tray, the user is required to manually change the order of the sheets of the product. The manual operation is very troublesome for the user.

SUMMARY OF THE INVENTION

In a first aspect of the present invention, there is provided a printing apparatus that is capable of conveying sheets to a sheet processing apparatus that is capable of performing saddle stitching processing and center folding processing on the sheets, comprising a printing unit configured to print images on sheets, a determination unit configured to determine whether or not the number of output sheets per one copy exceeds the number of sheets on which the saddle stitching processing can be executed, and a selection unit configured to, in a case where it is determined by the determination unit that the number of output sheets per one copy exceeds the number of sheets on which the saddle stitching processing can be executed, select, based on a user's instruction, whether to perform the center folding processing on the sheets on which images are printed by the printing unit without performing the saddle stitching processing thereon or to perform neither the saddle stitching processing nor the center folding processing on the sheets on which images are printed by the printing unit.

Further features of the present invention will become apparent from the following description of exemplary embodiments (with reference to the attached drawings).

BRIEF DESCRIPTION OF THE DRAWINGS

FIG. 9A is a diagram showing an example of a display screen for configuring settings for a bookbinding process.

FIG. 9B is a diagram showing an example of a display screen for setting a bookbound product as a left-opening bookbound product or a right-opening bookbound product.

FIGS. 14A to 14C are diagrams useful in explaining a method of laying out original images on respective pages in a case of discharge of recording sheets onto a saddle-stitched product tray after performing left-opening saddle stitching processing.

FIG. 15 is a diagram useful in explaining a method of laying out original images on respective pages in a case of discharge of recording sheets onto the saddle-stitched product tray after performing left-opening center folding processing.

FIG. 17A is a diagram showing an example of a display screen for setting a front cover.

FIG. 17B is a diagram showing an example of a display screen for selecting a sheet of the front cover.

FIGS. 19A, 19B, and 19C are diagrams useful in explaining a method of laying out original images on respective pages in a case of discharge of recording sheets onto the saddle-stitched product tray after performing saddle stitching processing for producing a left-opening bookbound product by attaching a front cover thereto.

FIG. 20 is a diagram useful in explaining a method of laying out original images on respective pages in a case of discharge of recording sheets onto the saddle-stitched product tray after performing center folding processing for producing a left-opening bookbound product by attaching a front cover thereto.

DESCRIPTION OF THE EMBODIMENTS

The present invention will now be described in detail below with reference to the accompanying drawings showing embodiments thereof.

Figure 1:
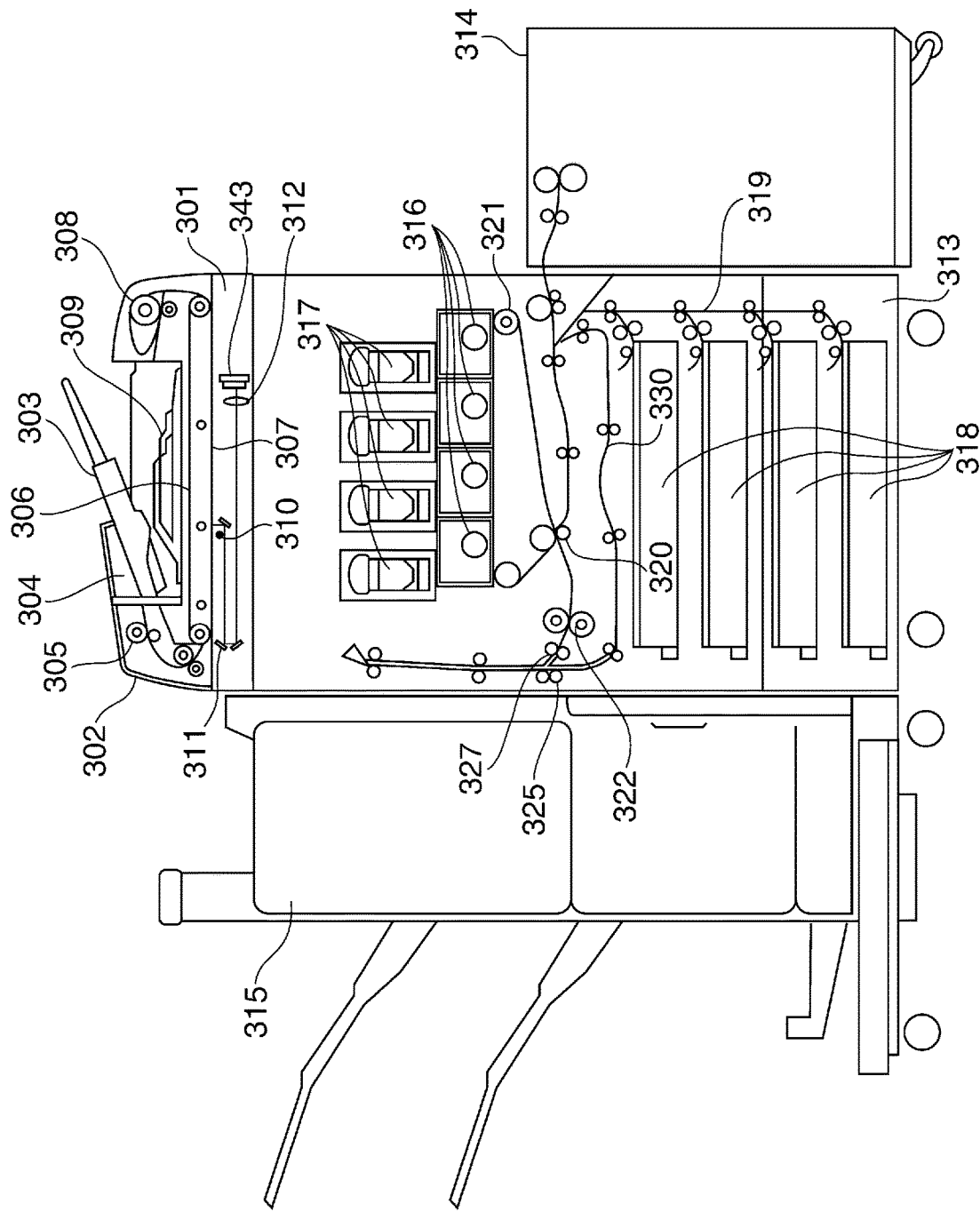
FIG. 1 is a schematic diagram of a printing apparatus according to an embodiment of the present invention.

FIG. 1 is a schematic diagram of a printing apparatus according to an embodiment of the present invention.

In the present embodiment, as an example of the printing apparatus, a description will be given of a multifunction peripheral having a plurality of functions, such as those of a copy machine, a printer, and a facsimile machine. Note that the printing apparatus is not limited to a multifunction peripheral, but it may be an apparatus having a single function.

Referring to FIG. 1, the printing apparatus includes a scanner section 301, a document feeder 302, a printer section 313 having four color drums, a sheet feeding deck 314, and a finisher 315.

First, a reading operation mainly performed by the scanner section 301 will be described.

In a case where the reading operation is performed by setting an original on an original platen glass, a user sets the original on the original platen glass, denoted by reference numeral 307, and closes the document feeder 302. When an opening/closing sensor detects that the document feeder 302 has been closed, and a start button, not shown, is pressed by a user, a reflection-type original size detection sensor (not shown) provided within a casing of the scanner section 301 detects the size of the set original. After the size of the original is detected, the original is irradiated with light from a light source 310, and the reflected light enters a CCD (Charge Couple Device) 343 via a reflecting plate 311 and a lens 312. The CCD 343 converts the incident light to digital signals, and delivers the digital signals to a controller (see FIG. 6). The controller converts the received digital signals to laser recording signals by performing desired image processing, and stores the laser recording signals in a memory as image data.

In a case where the reading operation is performed by setting an original on the document feeder 302, the user places the original on a tray of an original setting section 303 of the document feeder 302 in a face-up state. When the original is placed, the original is detected by an original detection sensor 304. When the controller receives a signal indicative of detection of the original from the original detection sensor 304 and the start button is pressed by the user, the controller causes an original feed roller 305 and a conveying belt 306 to be rotated to thereby cause the original to be conveyed to a predetermined position on the original platen glass 307. When the original is conveyed to the predetermined position, the controller performs an operation similar to the above-described reading operation performed on the original platen glass, and stores the obtained image data in the memory (not shown). Then, the original from which the image data has been read is discharged onto an original discharge tray 309 via a conveying roller 308.

When a plurality of original sheets are set on the document feeder 302, the controller discharges an original sheet from which the image data has been read, and simultaneously feeds the next original sheet via the original feed roller 305 to perform an operation for reading the next original sheet. Thus, the operation for reading the plurality of original sheets is performed.

Next, a printing operation performed by the printer section 313 will be described.

The image data temporarily stored in the memory of the controller is transferred to the printer section 313, and is converted by a laser recording section to recording laser beams for the respective colors of yellow, magenta, cyan, and black. Then, the recording laser beams are irradiated onto photosensitive members 316 of the respective colors, and an electrostatic latent image is formed on each photosensitive member 316. Then, toner development is performed using toner supplied from toner cartridges 317, and the visualized images are sequentially transferred by primary transfer onto an intermediate transfer belt 321 rotating in a clockwise direction to form a color image thereon. After that, when a recording sheet S fed from one of sheet cassettes 318 or the sheet feeding deck 314 through a sheet feeding conveying path 319 is conveyed to a secondary transfer position 320, the color image is transferred from the intermediate transfer belt 321 rotating in the clockwise direction onto the recording sheet. The recording sheet on which the color image has been transferred has its toner fixed by pressure and heat at a fixing device 322, and is conveyed through a discharge conveying path. Then, the recording sheet is discharged to a discharge port 325 from which the sheet is discharged to the finisher.

In double-sided printing, after the sheet has passed the fixing device 322, a flapper 327 switches the conveying path, and then the recording sheet is switched back and conveyed downward, and is fed to the secondary transfer position 320 again through a double-sided printing sheet conveying path 330, whereby a double-sided printing operation is achieved.

Next, the operation performed by the finisher 315 will be described.

The finisher 315 additionally performs post processing on recording sheets according to settings made by the user. More specifically, the finisher 315 has functions of stapling (one-point/two-point stapling), punching (two/three/four holes), saddle stitching, and so forth. The arrangement and operation of the finisher 315 will be described with reference to FIGS. 2 to 5.

Figure 2:
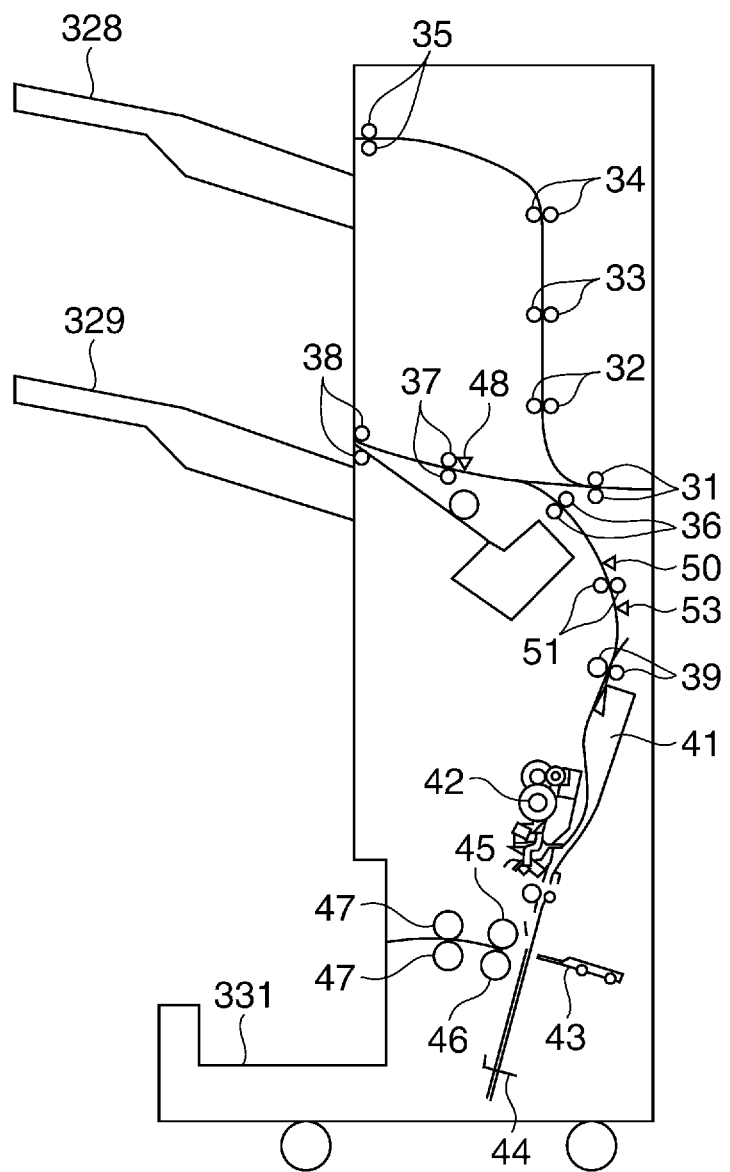
FIG. 2 is a schematic diagram of a finisher appearing in FIG. 1.
Figure 3A:
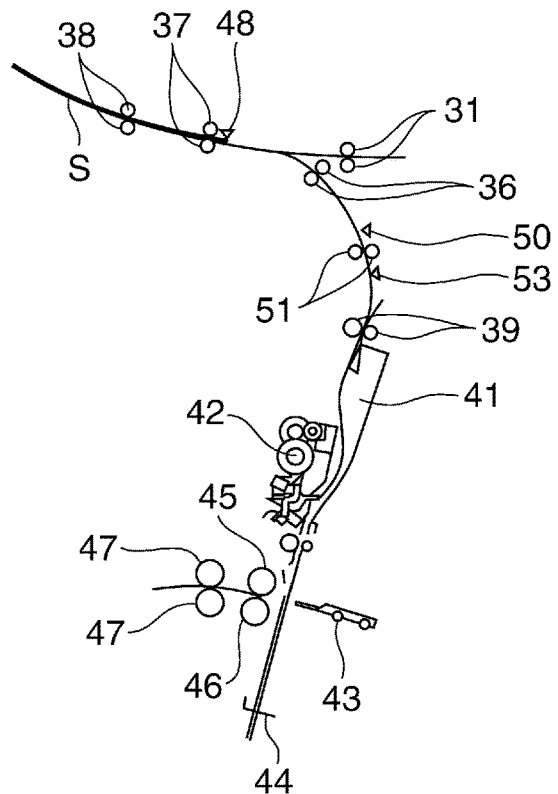
FIG. 3A is a diagram showing an internal structure of the finisher in a state where a recording sheet is nipped by conveying roller pairs.
Figure 3B:
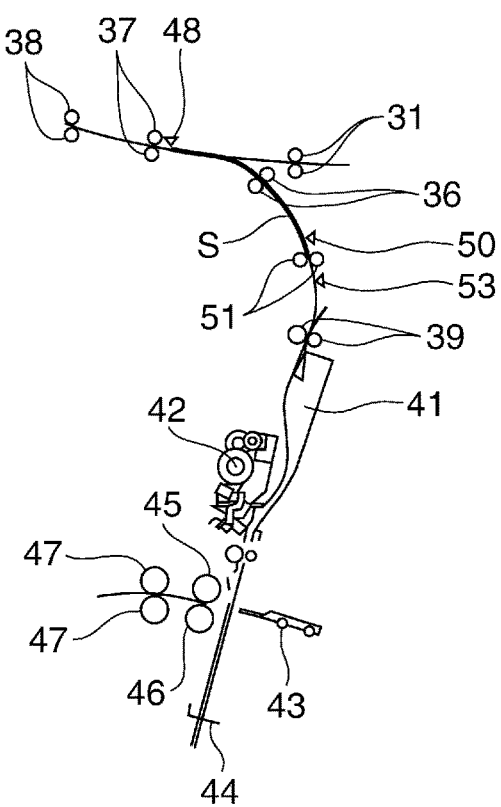
FIG. 3B is a diagram showing the internal structure of the finisher in a state where a leading edge of the recording sheet is brought into abutment with a nip of a skew correction roller pair.

Referring to FIG. 2, the finisher 315 includes conveying roller pairs 31 to 39, leading edge detection sensors 50 and 53, a trailing edge detection sensor 48, a stapler 42, a thrust plate 43, a stopper 44, folding rollers 45 and 46, and a bundle conveying roller pair 47.

The finisher 315 may be operated by commands from the controller of the printing apparatus shown in FIG. 1, or may be operated by a controller of its own.

A recording sheet having passed the discharge port 325 of the printing apparatus side is changed in discharge destination according to a selected one of the functions of copying, printing, facsimile, and so forth, for which settings are made by the user. When the printing apparatus is used as the printer, it is possible to make, using a printer driver, various settings concerning monochrome print/color print, the sheet size, 2-UP/4-UP/N-UP printing, double-sided printing, stapling, punching, saddle stitching, center folding, slip sheet, front cover, back cover, and so forth.

The recording sheet conveyed from the printing apparatus is discharged onto one of stacking trays 328 and 329 and a saddle-stitched product tray 331 according to the type of a finishing process set by the user. For example, when no finishing process is performed, the recording sheet is discharged onto the stacking tray 328. When normal stapling is to be performed, the recording sheet is discharged onto the stacking tray 329, whereas when saddle stitching and center folding, described hereinafter, are to be performed, the recording sheet is discharged onto the saddle-stitched product tray 331.

Further, the recording sheet conveyed from the printing apparatus is conveyed by the conveying roller pairs 31, 37, and 38 until the trailing edge of the recording sheet comes to the trailing edge detection sensor 48. Then, when the trailing edge of the recording sheet is detected by the trailing edge detection sensor 48, the conveying roller pairs 37 and 38 nipping the recording sheet are stopped (see FIG. 3A).

Next, the recording sheet is switched back by reverse rotation of the conveying roller pairs 37 and 38, and is conveyed by the conveying roller pair 36 until the leading edge of the recording sheet comes to the leading edge detection sensor 50. Then, when the leading edge of the recording sheet is detected by the leading edge detection sensor 50, the conveying roller pair 36 nipping the recording sheet is reduced in speed, and the leading edge of the recording sheet is brought into abutment with a nip of a skew correction roller pair 51 (see FIG. 3B).

Even after the leading edge of the recording sheet has been brought into abutment with the nip of the skew correction roller pair 51, the conveying roller pair 36 continues rotation for a while. Then, the recording sheet forms a loop in a loop forming space, and then the conveying roller pair 36 is stopped.

Figure 4A:
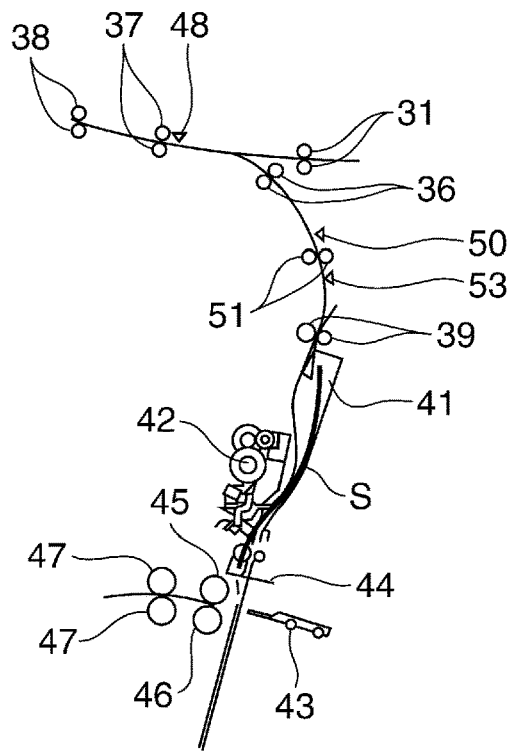
FIG. 4A is a diagram showing the internal structure of the finisher in a state where the leading edge of the recording sheet is brought into abutment with a stopper.
Figure 4B:
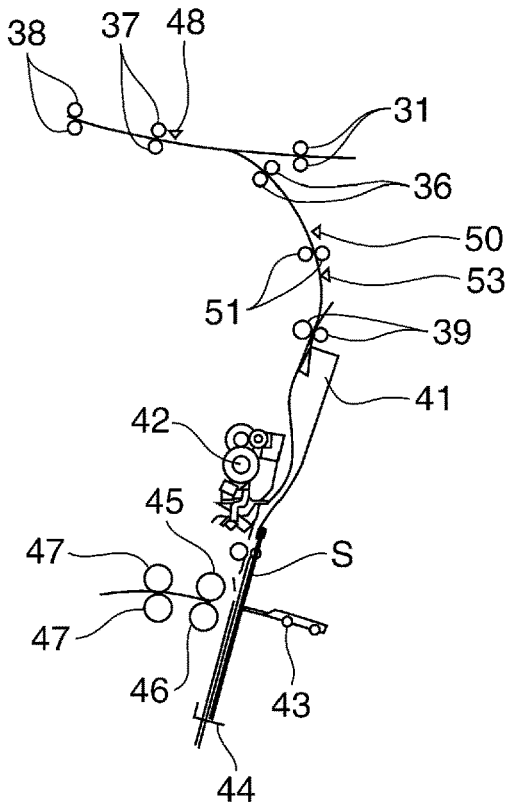
FIG. 4B is a diagram showing the internal structure of the finisher in a state where a recording sheet bundle stapled by a stapler has been moved downstream in a conveying direction.
Figure 5:
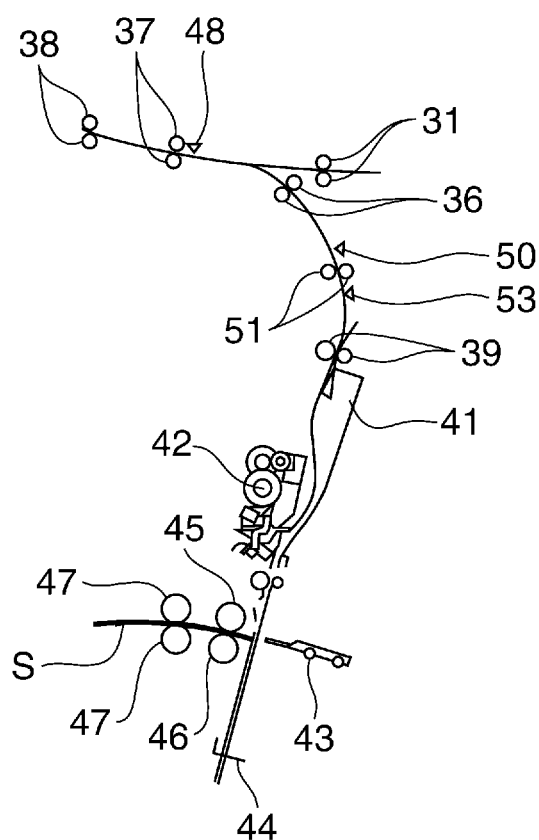
FIG. 5 is a diagram showing the internal structure of the finisher in a state where the recording sheet bundle is being discharged onto a saddle-stitched product tray by a bundle conveying roller pair.

Next, the skew correction roller pair 51 starts rotation. If the recording sheet is skewed, skew of the recording sheet is corrected by the skew correction roller pair 51. Then, the recording sheet subjected to skew correction is conveyed toward the conveying roller pair 39. After the leading edge of the recording sheet is detected by the leading edge detection sensor 53, the recording sheet is conveyed from this point by a predetermined distance, whereby the leading edge of the recording sheet is brought into abutment with the stopper 44 (see FIG. 4A). At this time, as shown in FIG. 4A, the recording sheet is positioned by the stopper 44 such that a central portion of the recording sheet is at a position for being subjected to stapling by the stapler 42. By repeating the above-described operation, the plurality of recording sheets are sequentially conveyed into a conveying path 41.

Then, when all of the recording sheets for forming a bookbound product have been conveyed into the conveying path 41, the recording sheets are aligned with each other in respect of width direction thereof by width direction alignment boards, not shown, whereby a recording sheet bundle is formed within the conveying path 41. In doing this, the recording sheets are sequentially conveyed into the conveying path 41, starting from one corresponding to the innermost sheet of the body of the bookbound product, ending with a recording sheet corresponding to the front cover of the bookbound product.

Then, if the settings for the finishing process include execution of saddle stitching, the stapler 42 executes stapling on the recording sheet bundle. After the recording sheet bundle is stapled by the stapler 42, the stopper 44 supporting the recording sheet bundle is moved downstream in the conveying direction. Accordingly, the recording sheet bundle is moved downstream in the conveying direction (see FIG. 4B).

The stopper 44 positions the recording sheet bundle such that the central portion of the recording sheet bundle comes to a position of the thrust plate 43. Then, a front end of the thrust plate 43 is brought into abutment with the central portion, where a fold is to be formed, of the recording sheet bundle positioned by the stopper 44, and the recording sheet bundle is pushed into a nip between the folding rollers 45 and 46 to thereby form the fold on the recording sheet bundle. Then, the recording sheet bundle having the fold formed by the folding rollers 45 and 46 is discharged onto the saddle-stitched product tray 331 by the bundle conveying roller pair 47 (see FIG. 5).

Next, a description will be given of the hardware configuration of the controller of the printing apparatus with reference to FIG. 6.

Figure 6:
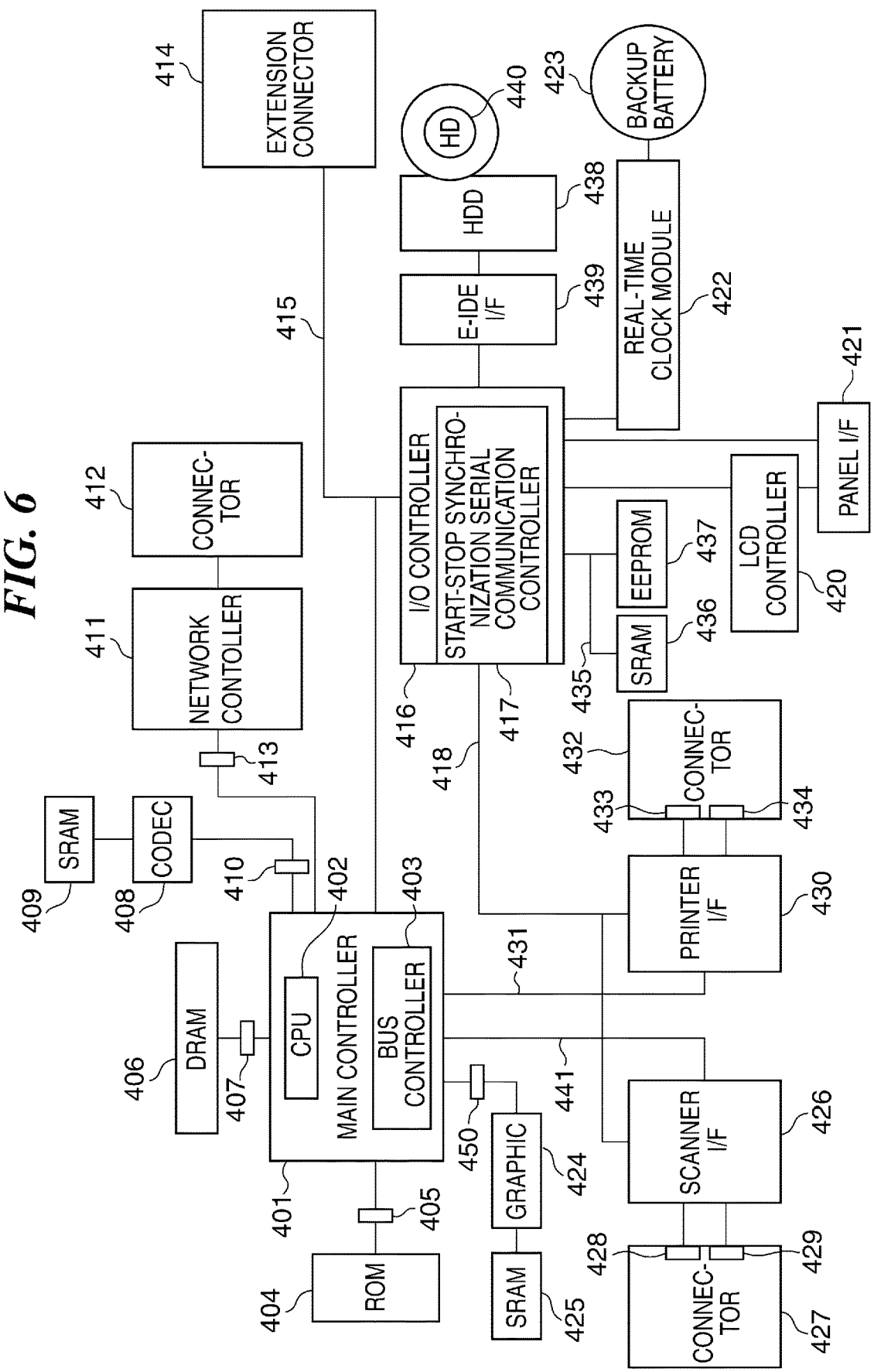
FIG. 6 is a block diagram of the hardware configuration of a controller of the printing apparatus.

Referring to FIG. 6, a main controller 401 is comprised of a CPU 402, a bus controller 403, and various interface controller circuits (not shown).

The CPU 402 and the bus controller 403 controls the overall operation of the printing apparatus, and the CPU 402 operates based on a program read from a ROM 404 via a ROM interface 405. Further, the operation for interpreting PDL (page description language) code data received from an external PC (not shown) and converting the data to raster image data is also described in this program, and is processed by software.

The bus controller 403 controls transfer of data input and output via the respective interfaces, and controls bus arbitration and DMA data transfer.

A DRAM 406 is connected to the main controller 401 via a DRAM interface 407, and is used as a work area for operation of the CPU 402, and an area for storing image data.

A codec (Codec) 408 compresses raster image data stored in the DRAM 406 by MH/MR/MMR/JBIG/JPEG or the like, and decompresses the compressed and stored code data back into raster image data.

An SRAM 409 is used as a temporary work area for the codec 408. The codec 408 is connected to the main controller 401 via an interface 410. Data transfer between the codec 408 and the DRAM 406 is controlled by the bus controller 403 whereby DMA transfer is performed.

A graphic processor (Graphic) 424 performs image rotation, image scaling, color space conversion, and binarization on the raster image data stored in the DRAM 406.

An SRAM 425 is used as a temporary work area for the graphic processor 424. The graphic processor 424 is connected to the main controller 401 via an interface 450. Data transfer between the graphic processor 424 and the DRAM 406 is controlled by the bus controller 403, whereby DMA transfer is performed.

A network controller 411 is connected to the main controller 401 via an interface 413, and is connected to an external network via a connector 412. As the network, in general, there may be mentioned an Ethernet (registered trademark) network. Reception of print data from an external PC, not shown, is controlled by the network controller 411, and the print data is sent to the CPU 402. The CPU 402 stores the received print data in the DRAM 406 or an HD (hard disk) 440, and processes the data.

Connected to a general-purpose high-speed bus 415 are an extension connector 414 and an I/O controller 416. In the present embodiment, transmission and reception of a command to and from the finisher 315 are performed via the general-purpose high-speed bus 415.

The I/O controller 416 is equipped with a two-channel start-stop synchronization serial communication controller 417 for transmitting and receiving control commands to and from CPUs of the scanner section 301 and the printer section 313. The I/O controller 416 is connected to a scanner interface 426 and a printer interface 430 via an I/O bus 418.

Figure 7:
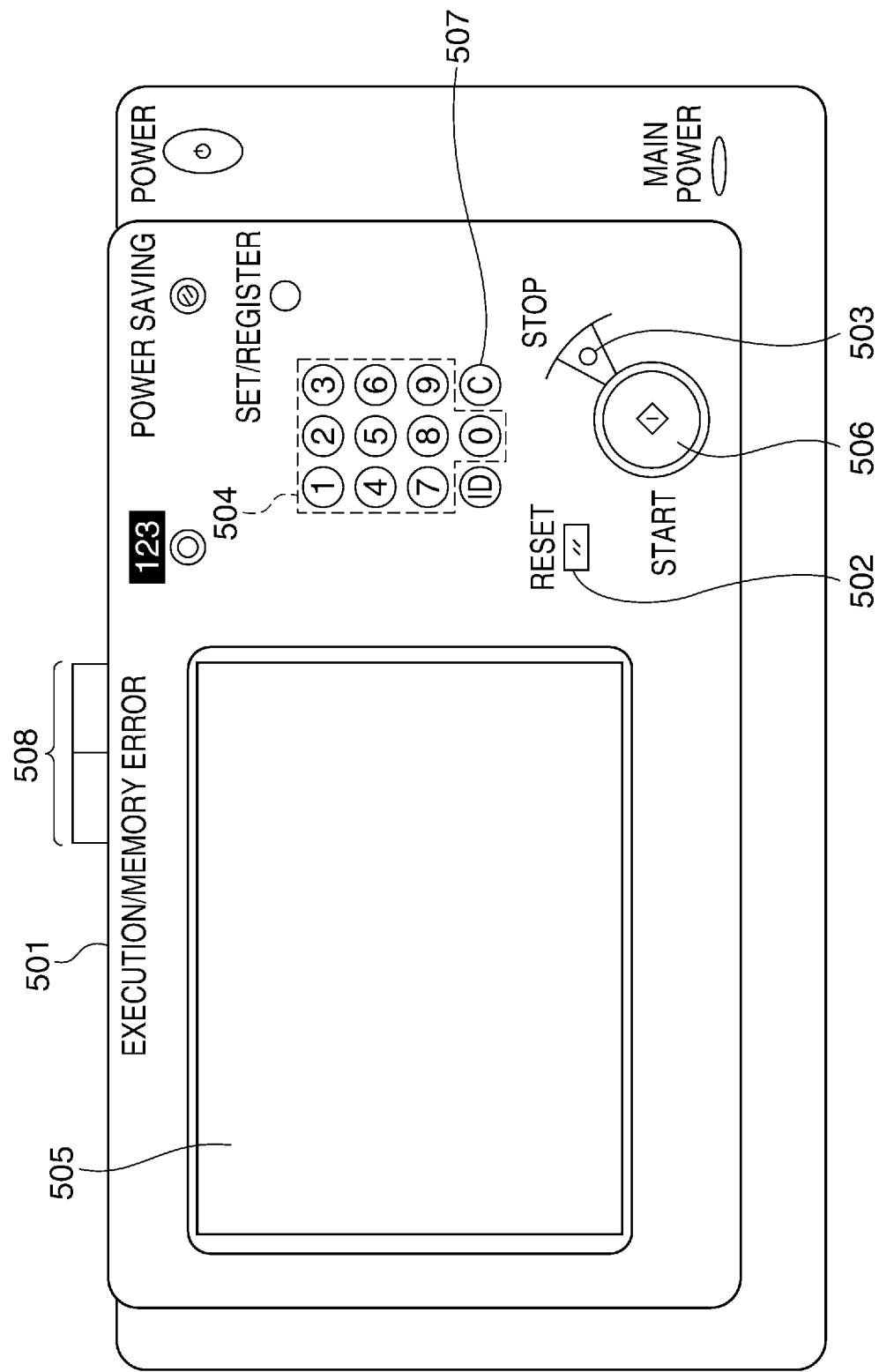
FIG. 7 is a diagram of the appearance of a console section.

A panel interface 421 is connected to an LCD controller 420, and is comprised of an interface for performing display on a liquid crystal display on a console section 501 shown in FIG. 7, and a key input interface for performing input from hard keys and touch panel keys.

The console section 501 shown in FIG. 7 is comprised of a liquid crystal display section, a touch panel input device mounted on the liquid crystal display section, and a plurality of hard keys. Signals input via the touch panel or the hard keys are transmitted to the CPU 402 via the above-mentioned panel interface 421. The liquid crystal display section displays image data sent via the panel interface 421. The liquid crystal display section displays functions of operation of the printing apparatus, image data, and so on. Details of the console section 501 will be described hereinafter.

A real-time clock module 422 is for updating/storing a date and time managed within the apparatus, and is backed up by a backup battery 423.

An E-IDE interface 439 is for connecting an external storage device to the printing apparatus. In the present embodiment, the CPU 402 is connected to a hard disk drive (HDD) 438 via the E-IDE interface 439 to cause image data to be stored in the HD 440 and to be read therefrom. Connectors 427 and 432 are connected to the scanner section 301 and the printer section 313, respectively, and include start-stop synchronization serial interfaces 428 and 433 and video interfaces 429 and 434, respectively.

The scanner interface 426 is connected to the scanner section 301 via the connector 427, and is also connected to the main controller 401 via a scanner bus 441. The scanner interface 426 has a function of performing predetermined processing on image data received from the scanner section 301. The scanner interface 426 also has a function of outputting a control signal generated based on a video control signal received from the scanner section 301 to the scanner bus 441. Data transfer from the scanner bus 441 to the DRAM 406 is controlled by the bus controller 403.

The printer interface 430 is connected to the printer section 313 via the connector 432, and is also connected to the main controller 401 via a printer bus 431. The printer interface 430 has a function of performing predetermined processing on image data output from the main controller 401, and outputting the processed image data to the printer section 313. The printer interface 430 also has a function of outputting a control signal generated based on a video control signal received from the printer section 313 to the printer bus 431. Transfer of raster image data loaded in the DRAM 406 to the printer section 313 is controlled by the bus controller 403, whereby DMA transfer of the raster image data to the printer section 313 via the printer bus 431 and the video interface 434 is performed.

An SRAM 436 is a memory configured to be capable of holding stored contents by power supplied from a backup battery even after the whole apparatus is powered off, and is connected to the I/O controller via a bus 435. An EEPROM 437 is also a memory similarly connected to the I/O controller via the bus 435.

Next, the console section 501 will be described with reference to FIG. 7.

A user makes various print settings via the console section 501. A reset key 502 is used for canceling settings or the like made by the user. A stop key 503 is used for interrupting a job being in operation. Ten keys 504 are used for inputting a numeric value.

A display section 505 that is formed by integrating the touch panel and the liquid crystal display section displays various screens on the liquid crystal display section based on instructions from the CPU 402, and receives instructions from the user via the touch panel. A start key 506 is used for starting a job, such as reading of an original. A clear key 507 is used for clearing the settings or the like. A lamp 508 is lit during execution of a job, occurrence of an error in the printing apparatus or the finisher 315, or the like, to thereby notify the user of a state of the apparatus.

Next, screens displayed on the display section 505 of the console section 501 will be described with reference to FIGS. 8A to 12.

Figure 8A:
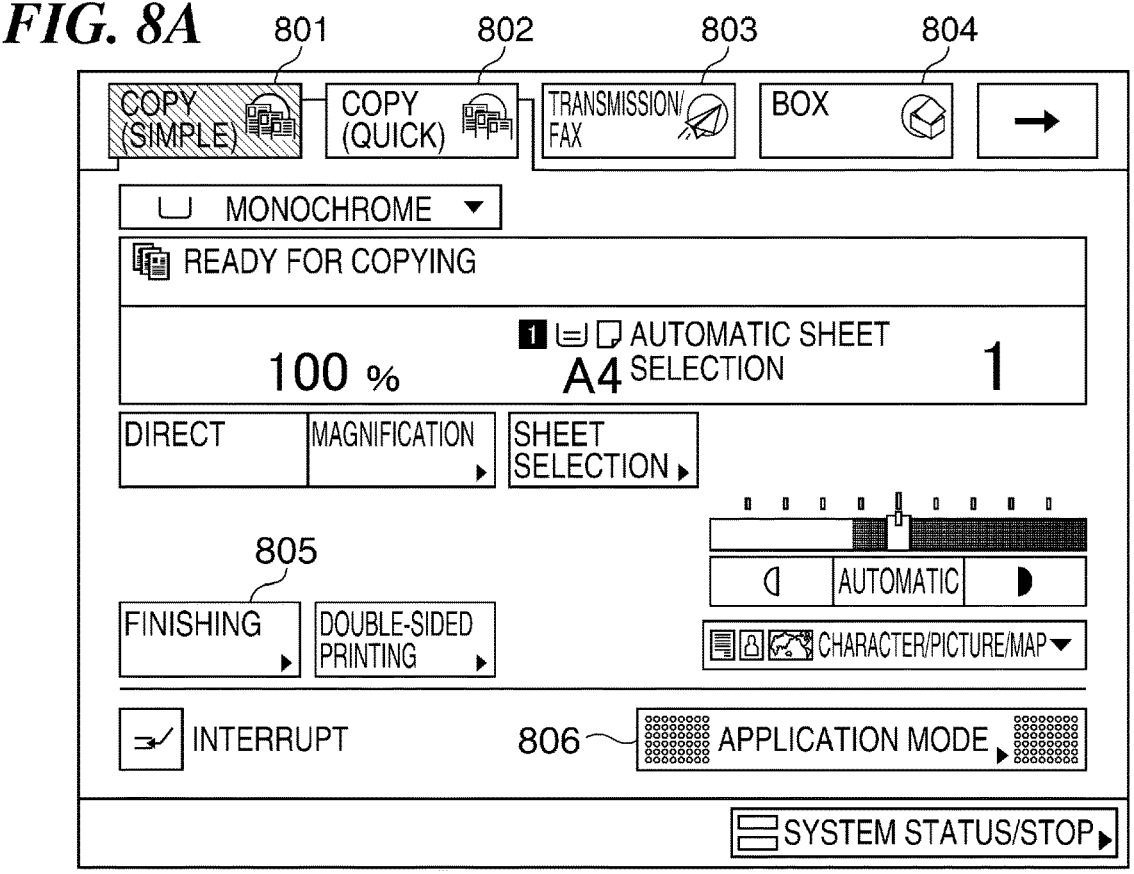
FIG. 8A is a diagram showing an example of a standard screen (initial screen) displayed on a display section.

FIG. 8A is a diagram showing an example of a standard screen (initial screen) displayed on the display section 505.

Tabs displayed in an upper portion of the screen are used for selecting various functions which can be performed by the printing apparatus. The tabs indicate a copy function (simple), a copy function (quick), a transmission/facsimile function, and a box function, from left to right in the mentioned order.

The copy function (simple) and the copy function (quick), denoted by reference numerals 801 and 802, respectively, are functions of printing image data of an original read by the scanner section 301, using the printer section 313, and performing a finishing process, such as stapling and saddle stitching, as required. The user can make settings on the copy function in a state where the copy function (simple) 801 or the copy function (quick) 802 has been selected. Note that the copy function (quick) 802 is a function which enables more settings to be made on a single screen than the copy function (simple) 801.

The transmission/facsimile function, denoted by reference numeral 803, is a transmission function including FAX transmission, E-mail transmission, and transmission to a file server.

The box function, denoted by reference numeral 804, is a function of storing image data read by the scanner section 301 in the HD 440, or manipulating and printing data stored in the HD 440.

When each tab of the above-described functions is selected, there is displayed an associated screen on which detailed settings of the selected function can be configured. The screen illustrated in FIG. 8A is a copy setting screen displayed in a state where the copy function (simple) 801 has been selected, and is used for receiving various settings associated with copying from the user. The copy setting screen illustrated in FIG. 8A includes a button for selecting between color copy, monochrome copy, and automatic selection, a button for designating single-sided copying or double-sided copying, a button for designating a copy magnification, buttons for performing finishing process, and so on. Two buttons are provided as the buttons for performing the finishing process. One is a "finishing" button 805. The "finishing" button 805 is a button for displaying a screen for receiving settings for performing stapling of ends of recording sheets by a stapler. The other is an "application mode" button 806. The "application mode" button 806 is a button for displaying a screen for receiving settings for performing the finishing process, such as saddle stitching and center folding, using the finisher 315 connected to the printing apparatus.

When the user desires to obtain a bookbound product on which saddle stitching and center folding are performed, the user makes settings via the screens shown in FIGS. 8A to 11B to cause the printing apparatus and the finisher 315 to perform the bookbinding process. Note that the term "the bookbinding process" in the present embodiment is intended to mean a process including saddle stitching for saddle stitching the recording sheets and center folding for folding the central portion of the recording sheets.

When the settings for performing the bookbinding process are made by the user, the printing apparatus generates images laid out based on the settings for pages to be printed, and executes printing according to the generated images. Then, the finisher 315 performs an appropriate finishing process based on the settings.

Figure 8B:
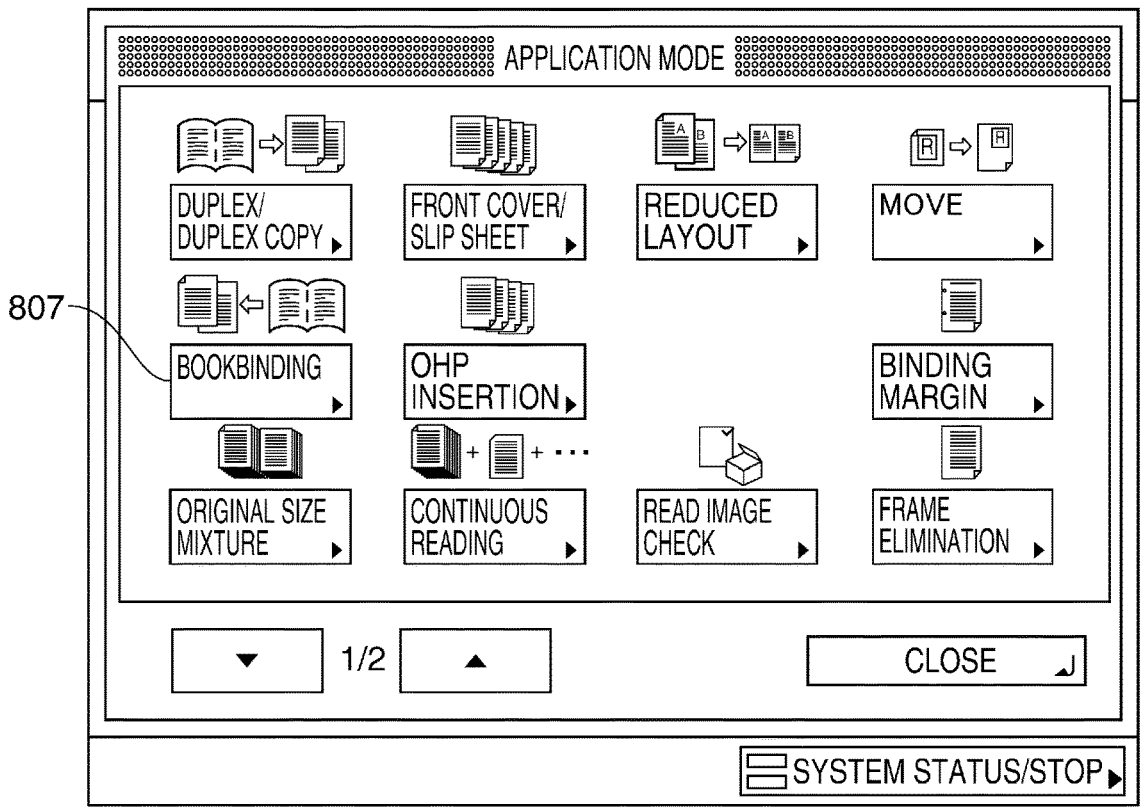
FIG. 8B is a diagram showing an example of a display screen displayed when an "application mode" button is pressed.
Figure 10A:
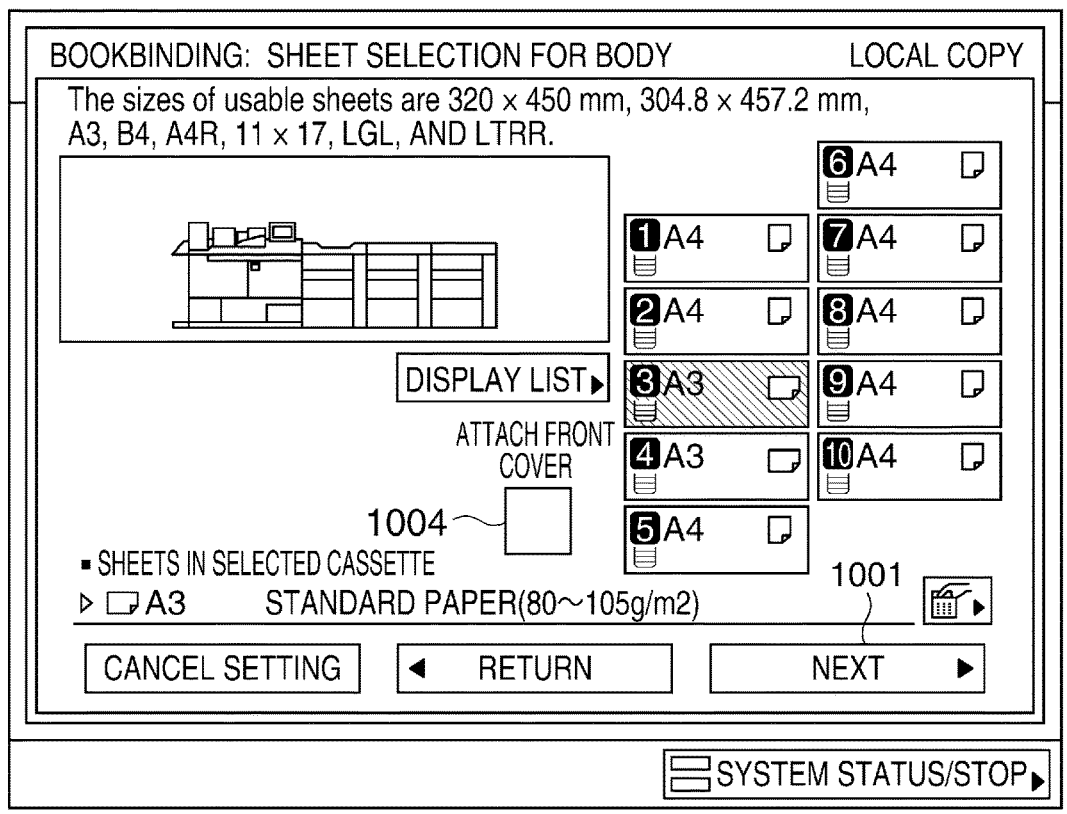
FIG. 10A is a diagram showing an example of a display screen for setting a sheet size of the body of the bookbound product.

To make settings for the finishing process, in the first place, the user presses the "application mode" button 806 on the screen shown in FIG. 8A. When the "application mode" button 806 is pressed, a screen shown in FIG. 8B is displayed on the display section 505. Then, by pressing a "bookbinding" button 807 on the screen shown in FIG. 8B, a screen for configuring the settings for the bookbinding process as shown in FIG. 9A is displayed. The user designates the size of originals to be read by the scanner section 301 via the screen shown in FIG. 9A. In the illustrated example in FIG. 9A, the A4 size is set as the size of originals. Then, when a "next" button 901 appearing in FIG. 9A is pressed, a screen shown in FIG. 9B is displayed. The user sets via the screen shown in FIG. 9B whether the bookbound product is to be a left-opening bookbound product which is bound so as to be read by turning pages from right to left or to be a right-opening bookbound product which is bound so as to be read by turning pages from left to right. Then, when a "next" button 902 on the screen shown in FIG. 9B is pressed, a screen shown in FIG. 10A is displayed. The user selects the sheet size of the body of the bookbound product via the screen shown in FIG. 10A. Further, the user is also capable of setting whether or not to attach a front cover to the bookbound product via the screen shown in FIG. 10A. The function of attaching a front cover to a bookbound product will be described hereinafter.

Figure 10B:
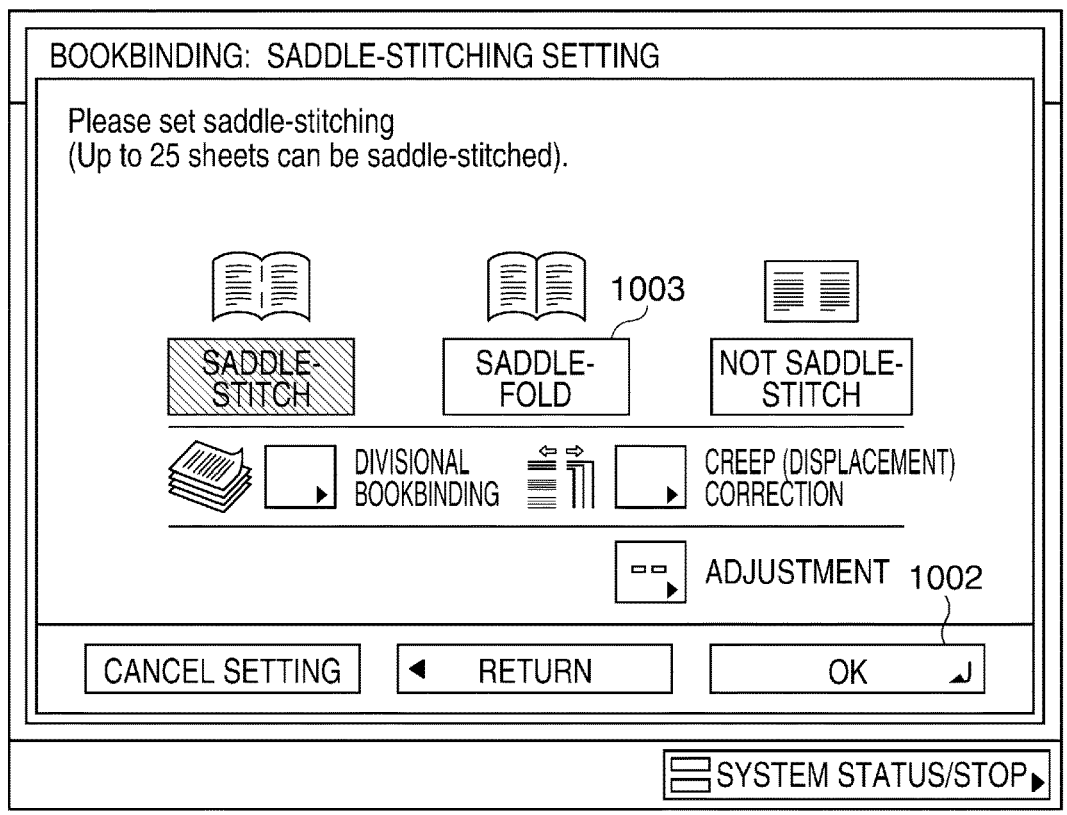
FIG. 10B is a diagram showing an example of a display screen for configuring settings for finishing of the bookbinding process.

When a "next" button 1001 is pressed on the screen shown in FIG. 10A, a screen shown in FIG. 10B is displayed. The screen shown in FIG. 10B is a screen for configuring settings for finishing of the bookbound product. The bookbound product is finished in the following three forms:

Form 1: saddle-stitched (saddle stitching is performed)
Form 2: saddle-folded (center folding is performed)
Form 3: non-saddle-stitched (bookbinding layout processing is performed)

In the case of Form 1, recording sheets printed by the printing apparatus are conveyed to the finisher 315, and are accumulated on the stopper 44 at a position indicated in FIG. 4A within the finisher 315. Then, when a predetermined number of printed recording sheets are accumulated, stapling of the center of the recording sheets by the stapler 42 is performed. After that, the recording sheets subjected to stapling are folded into two by the thrust plate 43 and the folding rollers 45 and 46. Then, the recording sheets are conveyed by the bundle conveying roller pair 47 and are discharged onto the saddle-stitched product tray 331.

In the case of Form 2, recording sheets printed by the printing apparatus are conveyed to the finisher 315, and are accumulated on the stopper 44 at the position indicated in FIG. 4A within the finisher 315. Then, when a predetermined number of printed recording sheets are accumulated, the recording sheets are folded into two by the thrust plate 43 and the folding rollers 45 and 46. The recording sheets are conveyed by the bundle conveying roller pair 47 and are discharged onto the saddle-stitched product tray 331. In this case, stapling is not performed.

In the case of Form 3, although images on the respective pages are arranged according to the bookbinding layout, the recording sheets are discharged without performing either stapling or folding. In this case, the recording sheets are discharged not onto the saddle-stitched product tray 331, but onto the stacking tray 328.

Figure 11A:
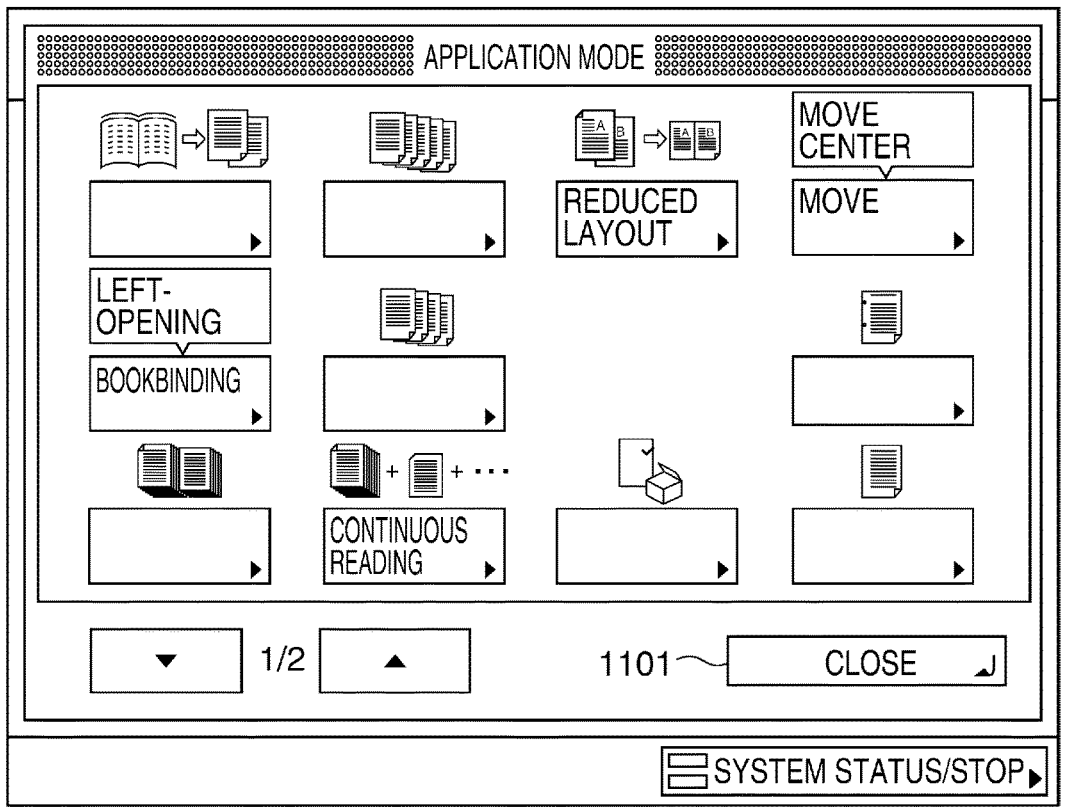
FIG. 11A is a diagram showing an example of a display screen displayed after configuring settings for the bookbinding process.

When settings for finishing of the bookbound product are made and an "OK" button 1002 is pressed on the screen shown in FIG. 10B, a screen shown in FIG. 11A is displayed. In doing this, the CPU 402 displays the settings received via the screens shown in FIGS. 9A to 10B and stored in the DRAM 406 on the screen. Then, when a "close" button 1101 is pressed on the screen shown in FIG. 11A, the CPU 402 displays a screen shown in FIG. 11B.

Figure 11B:
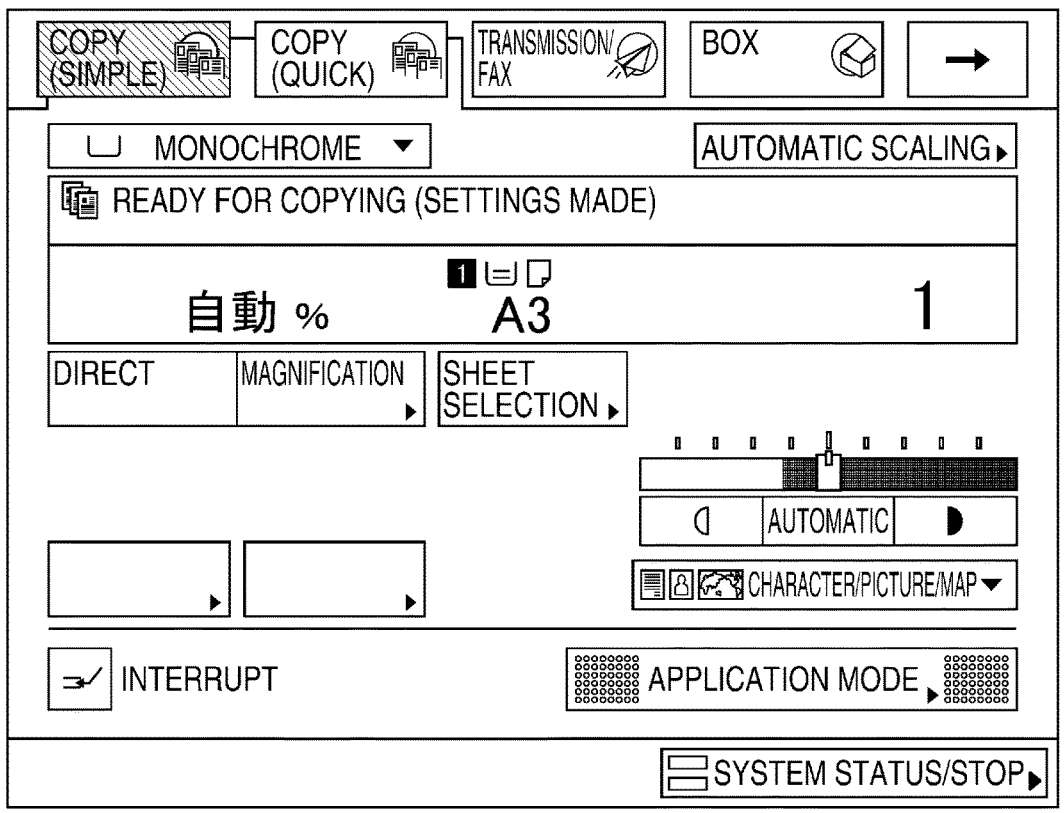
FIG. 11B is a diagram showing an example of the standard screen displayed after configuring the settings.

If the start key 506 is pressed in a state where the screen shown in FIG. 11B is displayed, the CPU 402 starts to cause the scanner section 301 to perform an original reading operation and the printer section 313 to perform a printing operation, according to the settings stored in the DRAM 406.

By performing the above-described operations, the user can obtain bookbound products on which saddle stitching, center folding or the like has been performed.

However, the number of recording sheets processable at a time is limited depending on the capabilities of the finisher 315 (capability of stapling recording sheets and capability of folding recording sheets). For example, the folding rollers 45 and 46 can fold only twenty-five recording sheets at a time. To cope with this limitation, in the present embodiment, if the number of recording sheets required to have images printed thereon for saddle stitching is larger than 25, the CPU 402 interrupts job processing, and displays an error pop-up shown in FIG. 12 on the display section 505.

Figure 12:
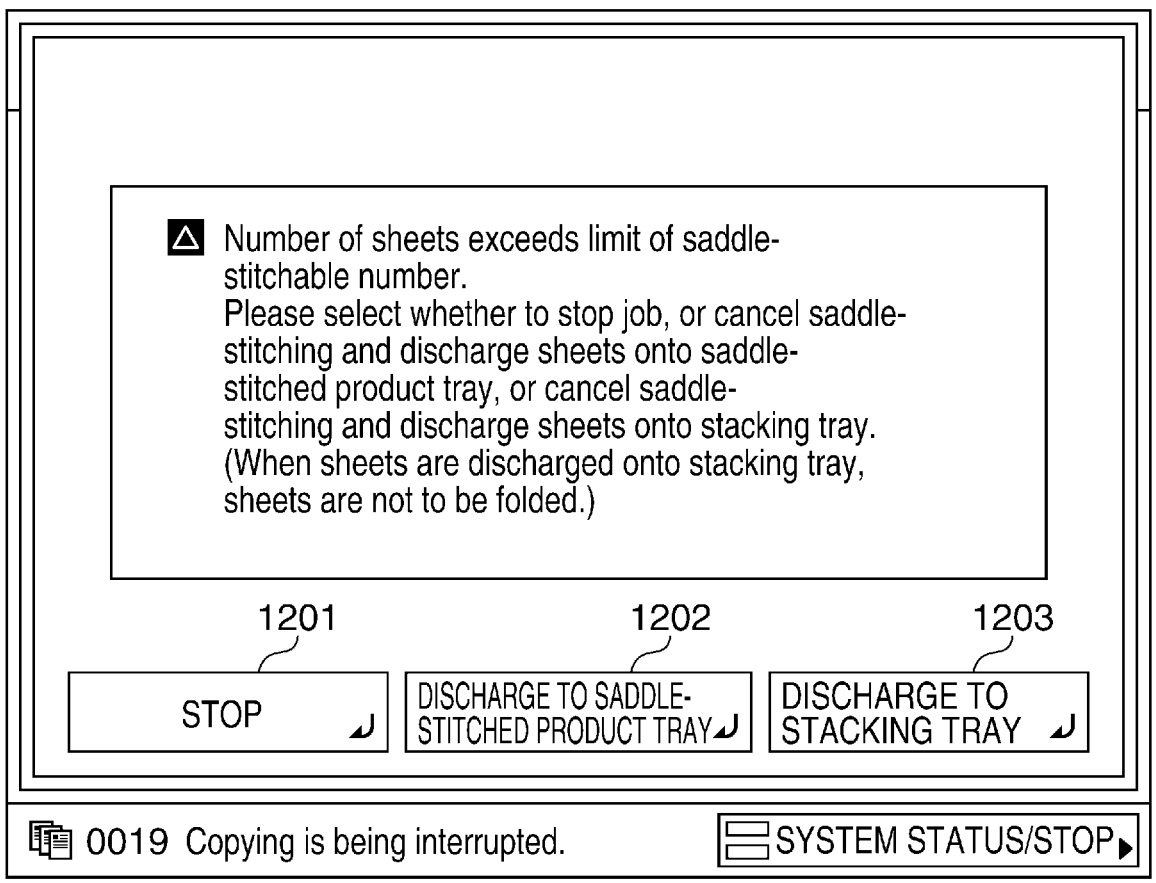
FIG. 12 is a diagram showing an example of an error pop-up screen displayed on the display section when a job is interrupted.

FIG. 12 is a diagram showing an example of the error pop-up displayed on the display section 505 when a job is interrupted.

The error pop-up shown in FIG. 12 receives from the user an instruction for an operation to be performed in a case where the number of recording sheets required to have images printed thereon for saddle stitching exceeds 25. The error pop-up shown in FIG. 12 includes a "stop" button 1201, a "discharge to processing tray" button 1202, and a "discharge to stacking tray" button 1203. The "stop" button 1201 is a button for forcibly terminating the job. The "discharge to processing tray" button 1202 is a button for performing center folding and discharging the sheets onto the saddle-stitched product tray 331 without performing stapling. The "discharge to stacking tray" button 1203 is a button for performing bookbinding layout processing for recording sheets and discharging the sheets onto the stacking tray 328 without performing either stapling or folding.

Further, also in a case where center folding is to be performed, since the folding rollers 45 and 46 are capable of folding only twenty-five recording sheets at a time, job processing is interrupted when the number of recording sheets exceeds the upper limit of the number of sheets processable at a time. In the case of execution of center folding, the folded recording sheets are conveyed by the bundle conveying roller pair 47 without being stapled. Therefore, there is a possibility that any of the recording sheets are displaced during being conveyed, causing a jam. To cope with, in the present embodiment, in the case of execution of center folding of the recording sheets, even though the finisher 315 is capable of folding maximum twenty-five sheets at a time, the CPU 402 causes each bundle of five sheets to be subjected to center folding and then be discharged. This makes it possible to stably convey the folded recording sheets, and thereby reduce possibility of occurrence of a jam.

Next, a description will be given, with reference to FIGS. 13 to 16, of image layouts and results of printing, in a case of execution of bookbinding layout processing and discharge of recording sheets onto the stacking tray 328, and in a case of execution of saddle stitching and center folding and discharge of recording sheets onto the saddle-stitched product tray 331.

Figure 13A:
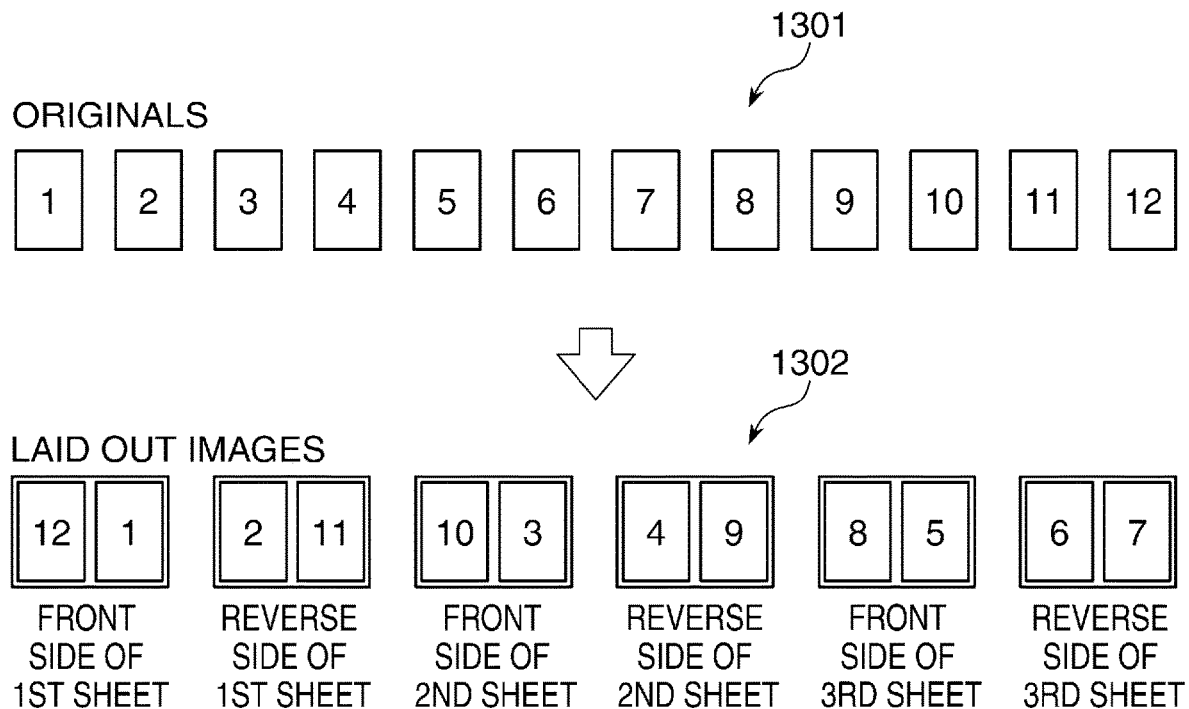
FIGS. 13A and 13B are diagrams useful in explaining a method of laying out original images on respective pages in a case of discharge of recording sheets onto a stacking tray after performing left-opening bookbinding layout processing.
Figure 13B:
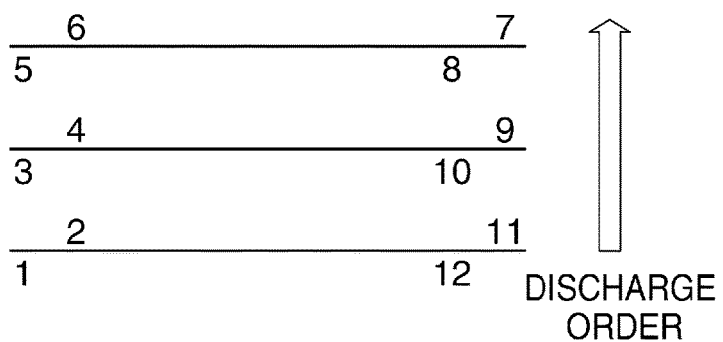

FIGS. 13A and 13B are diagrams useful in explaining a method of laying out original images on the respective pages in the case of execution of bookbinding layout processing for a left-opening bookbound product and discharge of recording sheets onto the stacking tray 328.

In the case of discharge of recording sheets onto the stacking tray 328, images on the respective pages of the original, denoted by reference numeral 1301, are laid out as denoted by reference numeral 1302 in the DRAM 406 and held therein. Then, when the layout of the images is completed, the images are printed in the order from images to be printed on a sheet corresponding to the outermost sheet of the bookbound product to images to be printed on a sheet corresponding to the innermost sheet. When the images are laid out as denoted by reference numeral 1302 in FIG. 13A, the CPU 402 causes page printing to be performed in the order of a front side of a first sheet, a reverse side of the first sheet, a front side of a second sheet, a reverse side of the second sheet, a front side of a third sheet, and a reverse side of the third sheet. Further, the CPU 402 causes the conveying roller pairs 31 to 35 to discharge the printed recording sheets onto the stacking tray 328. FIG. 13B shows a result of discharge of the printed recording sheets on the stacking tray 328.

FIGS. 14A and 14B are diagrams useful in explaining a method of laying out original images on the respective pages in the case of execution of saddle stitching processing for a left-opening bookbound product and discharge of recording sheets onto the saddle-stitched product tray 331.

In the case of discharge of recording sheets onto the saddle-stitched product tray 331 after saddle stitching processing, the images on the respective pages of the original 1301 are laid out as denoted by reference numeral 1402 in the DRAM 406 and held therein. Then, when the layout of the images is completed, the images are printed in the order from images to be printed on a sheet corresponding to the innermost sheet of the bookbound product to images to be printed on a sheet corresponding to the outermost sheet. When the images are laid out as denoted by reference numeral 1402 in FIG. 14A, the CPU 402 causes page printing to be performed in the order of a front side of a first sheet, a reverse side of the first sheet, a front side of a second sheet, a reverse side of the second sheet, a front side of a third sheet, and a reverse side of the third sheet. Further, after causing the conveying roller pairs 31, 37, and 38 to convey each printed recording sheet until the trailing edge of the recording sheet comes to the trailing edge detection sensor 48, the CPU 402 causes the recording sheet to be switched back by reverse rotation of the conveying roller pairs 37 and 38 and be conveyed to the conveying path 41, such that the recording sheets are sequentially accumulated therein (see FIG. 14B). Then, after execution of stapling, folding is performed, and the printed recording sheets are discharged onto the saddle-stitched product tray 331. FIG. 14C shows a result of discharge of the printed recording sheets on the saddle-stitched product tray 331.

On the other hand, by pressing a "saddle-folding" button 1003 on the screen shown in FIG. 10B, the user can select the function of center folding processing for performing only folding of printed sheets without stapling the same, and then discharging the same.

Figure 16A:
FIGS. 16A and 16B are diagrams, continued from FIG. 15, which are useful in explaining the method of laying out the original images on respective pages in the case of discharge of the recording sheets onto the saddle-stitched product tray after performing left-opening center folding processing.
Figure 16B:
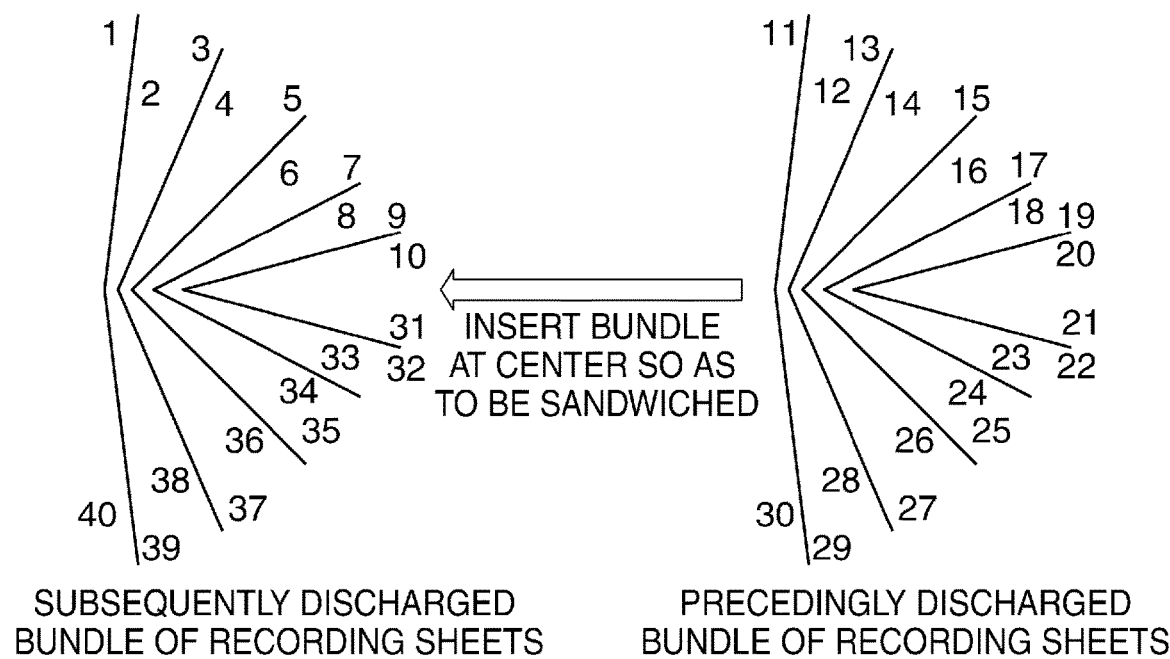

FIGS. 15, 16A, and 16B are diagrams useful in explaining a method of laying out original images on the respective pages in the case of execution of center folding processing for a left-opening bookbound product and discharge of recording sheets onto the saddle-stitched product tray 331.

In the case of discharge of recording sheets onto the saddle-stitched product tray 331 after center folding processing, images on the respective pages of the original, denoted by reference numeral 1501, are laid out as denoted by reference numeral 1502 in the DRAM 406 and held therein. Then, when the layout of the images is completed, the images are printed in the order from images to be printed on a sheet corresponding to the innermost sheet of the bookbound product to images to be printed on a sheet corresponding to the outermost sheet. When the images are laid out as denoted by reference numeral 1502 in FIG. 15, the CPU 402 causes page printing to be performed in the order of a front side of a first sheet, a reverse side of the first sheet, a front side of a second sheet, a reverse side of the second sheet, a front side of a third sheet, a reverse side of the third sheet, and so on. Further, after causing the conveying roller pairs 31, 37, and 38 to convey each printed recording sheet until the trailing edge of the recording sheet comes to the trailing edge detection sensor 48, the CPU 402 causes the recording sheet to be switched back by reverse rotation of the conveying roller pairs 37 and 38 and be conveyed to the conveying path 41 such that the recording sheets are sequentially accumulated therein (see FIG. 16A). In doing this, if the number of recording sheets included in one set is larger than five, folding is performed on each bundle of five sheets accumulated in the conveying path 41, and the bundle of five folded sheets is discharged onto the saddle-stitched product tray 331. FIG. 16B shows respective results of discharge of bundles of printed recording sheets onto the saddle-stitched product tray 331. The user can obtain a bookbound product by combining the bundles of printed recording sheets afterwards such that a precedingly discharged bundle of printed recording sheets receives a subsequently discharged bundle of printed recording sheets at the center thereof in a sandwiching manner.

Figures 17A, 17B:
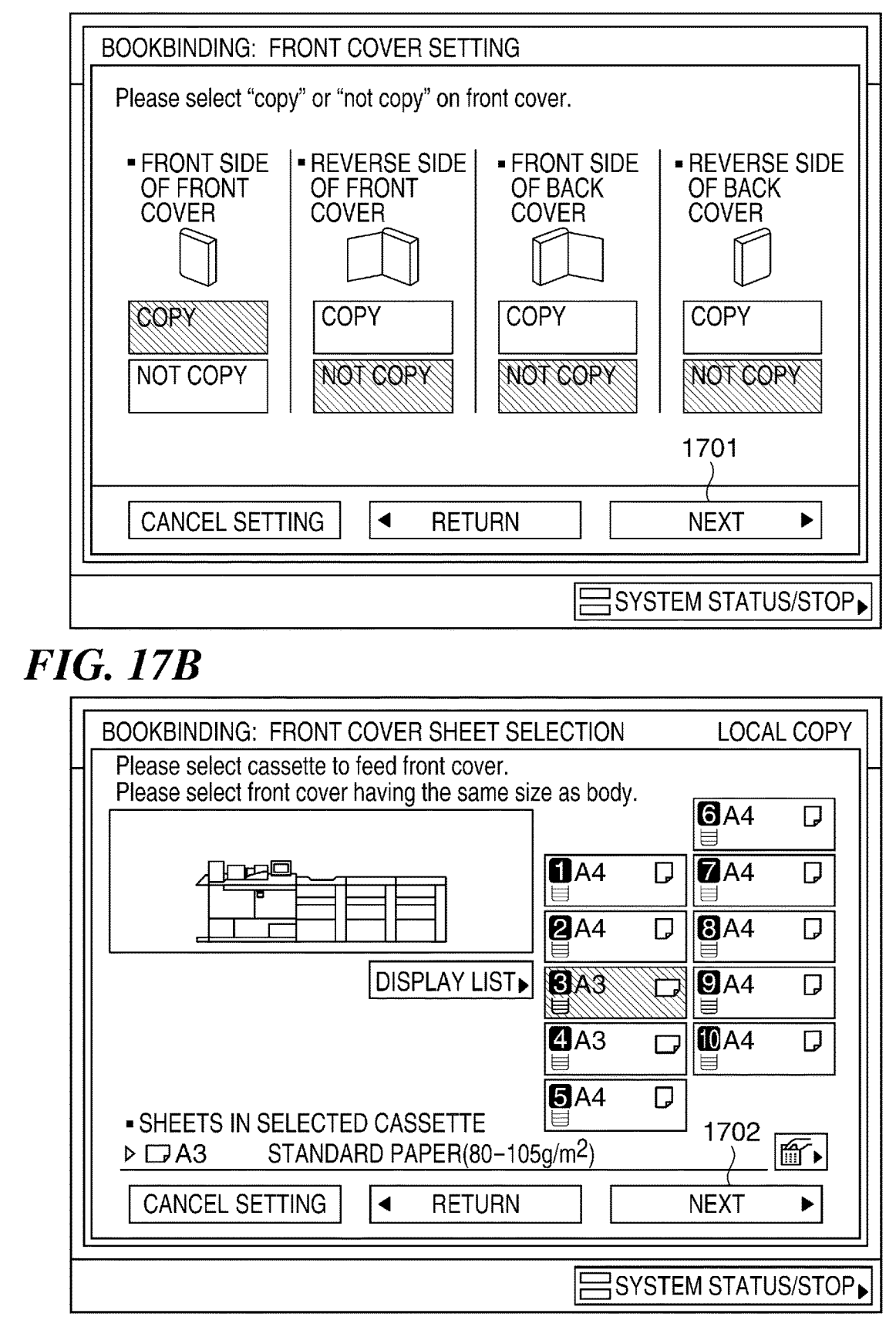

On the other hand, during configuration of the bookbinding process using the screens shown in FIGS. 8B to 11A, the user can press an "attach front cover" button 1004 on the screen shown in FIG. 10A to thereby make a setting of using the function of attaching the front cover to a bookbound product. For example, when the "next" button 1001 on the screen shown in FIG. 10A is pressed in a state where the "attach front cover" button 1004 has been selected, a screen shown in FIG. 17A is displayed. The user can set, via the screen shown in FIG. 17A, on which side of the cover the image is to be printed. On this screen, the setting of "copy" or "not copy" is received for each of a front side of a front cover, a reverse side of the front cover, a front side of a back cover, and a reverse side of the back cover. Then, when a "next" button 1701 on the screen shown in FIG. 17A is pressed, a screen shown in FIG. 17B is displayed. The user selects a sheet size of the front cover of the bookbound product via the screen shown in FIG. 17B. Then, when a "next" button 1702 on the screen shown in FIG. 17B is pressed, the screen shown in FIG. 10B is displayed.

Figure 18A:
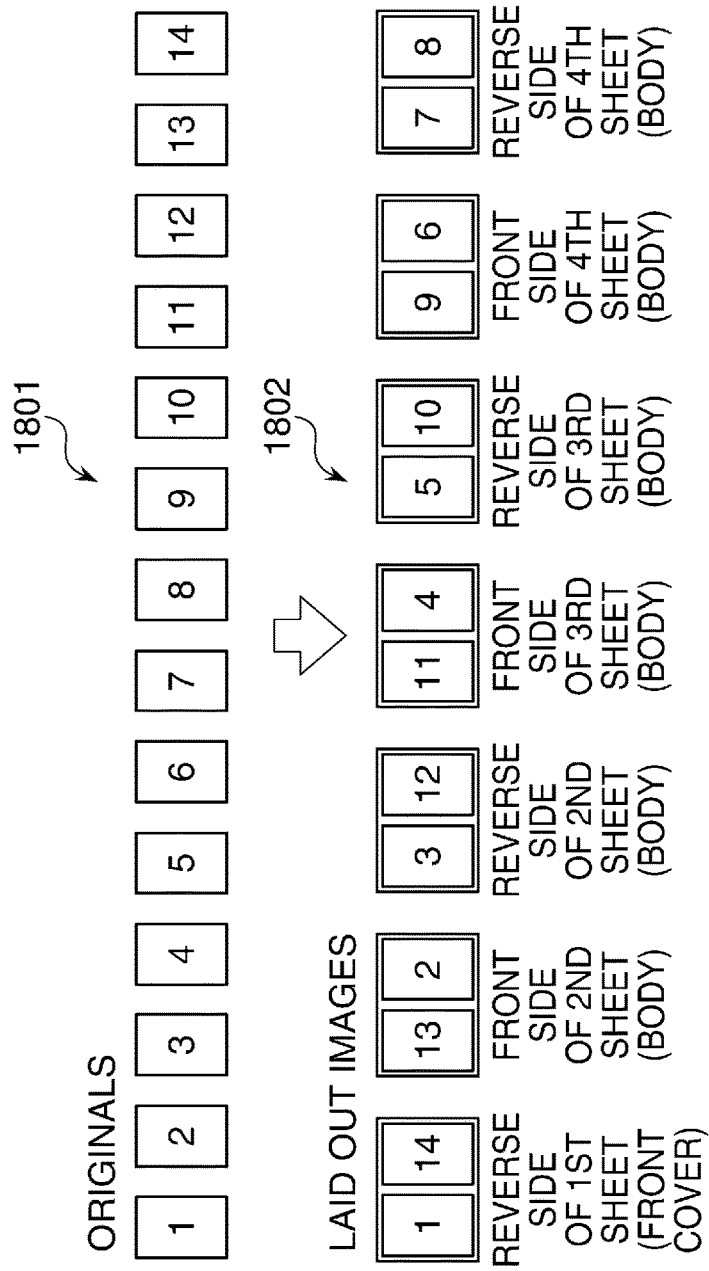
FIGS. 18A and 18B are diagrams useful in explaining a method of laying out original images on respective pages in a case of discharge of recording sheets onto the stacking tray after performing bookbinding layout processing for producing a left-opening bookbound product by attaching a front cover thereto.
Figure 18B:
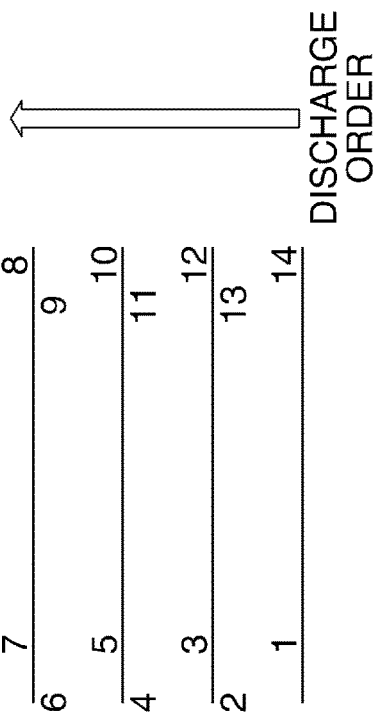

FIGS. 18A and 18B are diagrams useful in explaining a method of laying out original images on the respective pages in a case of discharge of recording sheets onto the stacking tray 328 after executing bookbinding layout processing for producing a left-opening bookbound product by attaching a front cover thereto.

In the case of discharge of the recording sheets onto the stacking tray 328, images on the respective pages of the original, denoted by reference numeral 1801, are laid out as denoted by reference numeral 1802 and held therein. Then, when the layout of the images is completed, the images are printed in the order of images to be printed on a sheet corresponding to the front cover of the bookbound product to images to be printed on sheets corresponding to the body of the bookbound product. When the images are laid out as denoted by reference numeral 1802 in FIG. 18, the CPU 402 causes page printing to be performed on a reverse side of a first sheet (front cover) first. Then, the CPU 402 causes page printing to be performed in the order of a front side of a second sheet (body), a reverse side of the second sheet (body), a front side of a third sheet (body), a reverse side of the third sheet (body), a front side of a fourth sheet (body), and a reverse side of the fourth sheet (body). Further, the CPU 402 causes the conveying roller pairs 31 to 35 to discharge the printed recording sheets onto the stacking tray 328. FIG. 18B shows a result of discharge of the printed recording sheets on the stacking tray 328.

FIGS. 19A, 19B, and 19C are diagrams useful in explaining a method of laying out original images on the respective pages in a case of discharge of recording sheets onto the saddle-stitched product tray 331 after saddle stitching processing for producing a left-opening bookbound product by attaching a front cover thereto.

In the case of discharge of recording sheets onto the saddle-stitched product tray 331 after saddle stitching processing, images on the respective pages of the original, denoted by reference numeral 1901, are laid out as denoted by reference numeral 1902 in the DRAM 406 and held therein. Then, when the layout of the images is completed, the images are printed in the order of images to be printed on sheets corresponding to the body of the bookbound product to images to be printed on a sheet corresponding to the front cover of the bookbound product. When the images are laid out as denoted by reference numeral 1902 in FIG. 19A, the CPU 402 causes page printing to be performed in the order of a front side of a first sheet (body), a reverse side of the first sheet (body), a front side of a second sheet (body), a reverse side of the second sheet (body), a front side of a third sheet (body), and a reverse side of the third sheet (body). Then, finally, the CPU 402 causes page printing to be performed on a reverse side of a fourth sheet (front cover). Further, after causing the conveying roller pairs 31, 37, and 38 to convey each printed recording sheet until the trailing edge of the recording sheet comes to the trailing edge detection sensor 48, the CPU 402 caused the recording sheet to be switched back by reverse rotation of the conveying roller pairs 37 and 38 and be conveyed to the conveying path 41 such that the printed recording sheets are sequentially accumulated therein (see FIG. 19B). Then, folding is performed after stapling the sheets, and the folded sheets are discharged onto the saddle-stitched product tray 331. FIG. 19C shows a result of discharge of the printed recording sheets onto the saddle-stitched product tray 331.

Figures 21A, 21B:
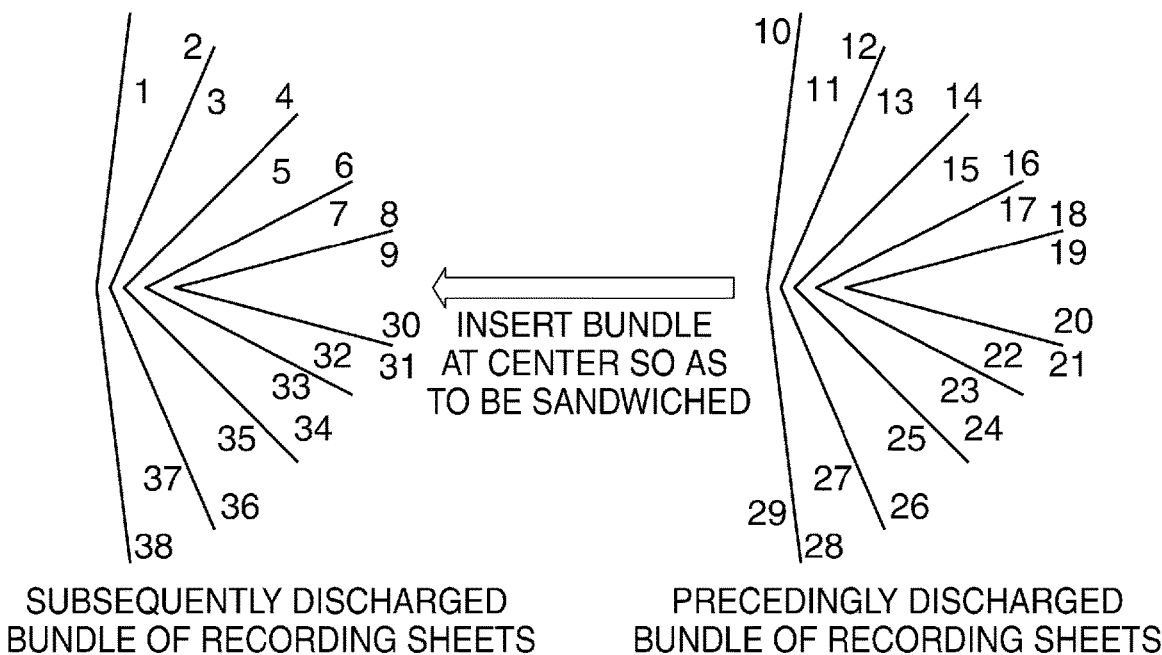
FIGS. 21A and 21B are diagrams, continued from FIG. 20, which are useful in explaining the method of laying out original images on the respective pages in the case of discharge of the recording sheets onto the saddle-stitched product tray by performing center folding processing for producing the left-opening bookbound product by attaching the front cover thereto.

FIGS. 20, 21A, and 21B are diagrams useful in explaining a method of laying out original images on the respective pages in a case of discharge of recording sheets onto the saddle-stitched product tray 331 after performing center-folding processing for producing a left-opening bookbound product by attaching a front cover thereto.

In the case of discharge of the recording sheets onto the saddle-stitched product tray 331 after center-folding processing, images on the respective pages of the original, denoted by reference numeral 2001, are laid out as denoted by reference numeral 2002 in the DRAM 406 and held therein. Then, when the layout of the images is completed, the images are printed in the order from images to be printed on sheets corresponding to the body of the bookbound product to images to be printed on a sheet corresponding to the front cover of the bookbound product. When the images are laid out as denoted by reference numeral 2002 in FIG. 20, the CPU 402 causes page printing to be performed in the order of a front side of a first sheet (body), a reverse side of the first sheet (body), a front side of a second sheet (body), a reverse side of the second sheet (body), a front side of a third sheet (body), a reverse side of the third sheet (body), and so on. Then, finally, the CPU 402 causes page printing to be performed on a reverse side of a tenth sheet (front cover). Further, after causing the conveying roller pairs 31, 37, and 38 to convey each printed recording sheet until the trailing edge of the recording sheet reaches the trailing edge detection sensor 48, the CPU 402 causes the printed recording sheet to be switched back by reverse rotation of the conveying roller pairs 37 and 38 and be conveyed to the conveying path 41 such that the printed recording sheets are sequentially accumulated therein (see FIG. 21A). In doing this, if the number of recording sheets included in one set is larger than five, folding is performed on each bundle of five sheets accumulated in the conveying path 41, and the bundle of five folded sheets is discharged onto the saddle-stitched product tray 331. FIG. 21B shows respective results of discharge of bundles of printed recording sheets onto the saddle-stitched product tray 331.

Next, a description will be given of a bookbinding process performed by the CPU 402 in the present embodiment with reference to FIGS. 22A, 22B, and 22C. Note that the CPU 402 executes the steps of the bookbinding process in FIGS. 22A, 22B, and 22C by executing the program stored in the ROM 404.

First, the CPU 402 starts the process upon receipt of a job execution request provided by pressing the start key 506. For example, when the CPU 402 receives a request for execution of a copy job for printing images of originals by the printer section 313, which is read by the scanner section 301, the CPU 402 causes the images of the originals to be printed after laying out the same, and performs the illustrated processing on the printed recording sheets. Further, when the CPU 402 receives a request for execution of a print job for printing images received from an external PC by the printer section 313, the CPU 402 causes the images received from the PC to be printed after laying out the same and performs the illustrated processing on the printed recording sheet.

In a step S5001, the CPU 402 determines whether or not bookbinding is designated. If it is determined that bookbinding is designated, the process proceeds to a step S5004, whereas if not, the process proceeds to a step S5002.

In the step S5002, the CPU 402 determines that the discharge destination is the stacking tray 328, and the process proceeds to a step S5003. Then, in the step S5003, the CPU 402 causes normal print processing to be performed based on settings other than those for the bookbinding process, received from the user. This corresponds, for example, to a case where printing is performed by the printing apparatus and recording sheets are discharged without performing post-processing by the finisher 315.

On the other hand, in the case where the process proceeds to the step S5004, the CPU 402 determines whether or not saddle stitching is designated. If it is determined that saddle stitching is designated, the process proceeds to a step S5005, whereas if not, the process proceeds to a step S5045 in FIG. 22C.

In the step S5045, the CPU 402 determines whether or not center folding is designated. If it is determined that center folding is designated, the process proceeds to a step S5024 in FIG. 22B, whereas if not, the process proceeds to a step S5037.

Figure 22A:
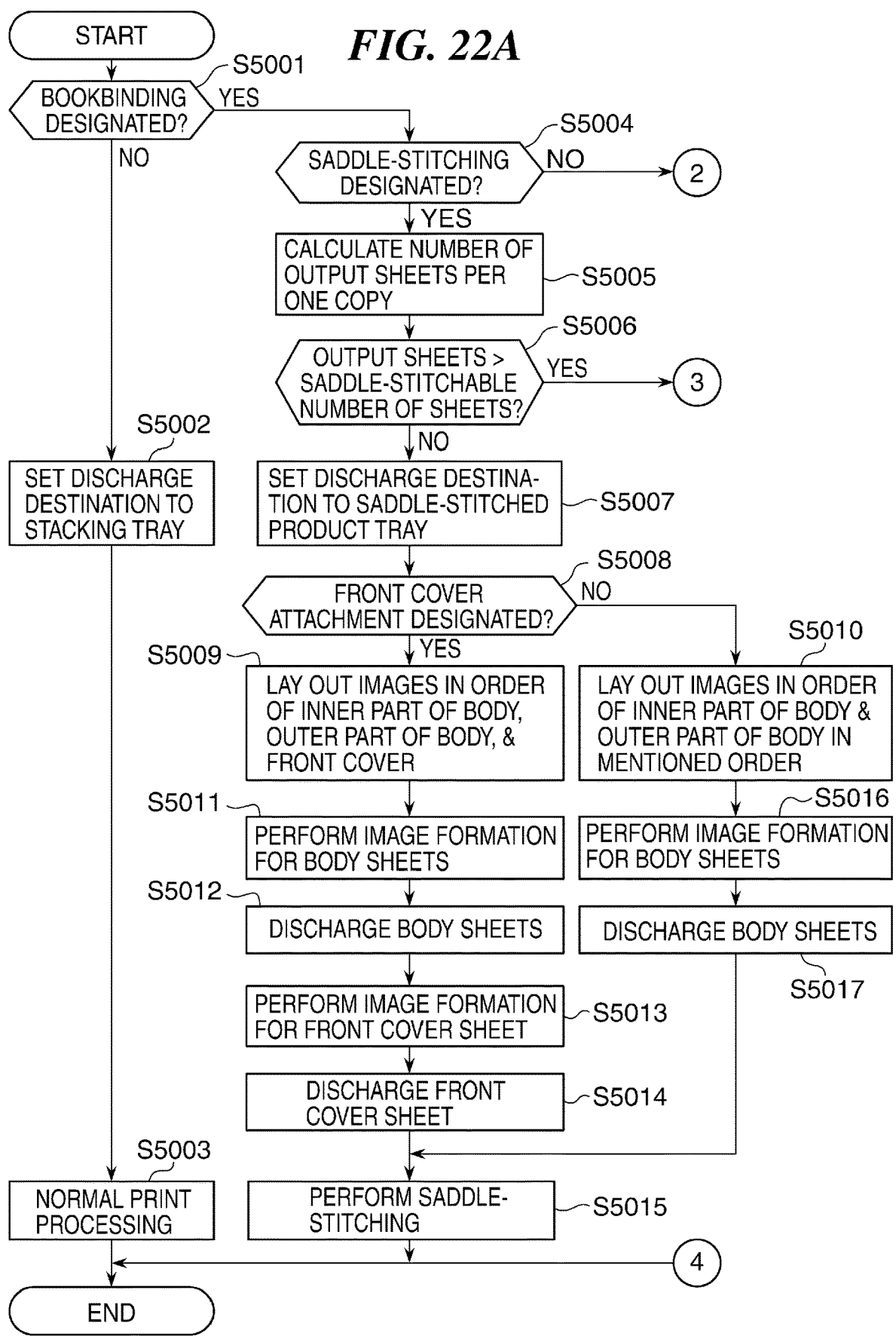
FIG. 22A is a flowchart of a bookbinding process performed by a CPU.

On the other hand, if it is determined in the step S5004 in FIG. 22A that saddle stitching is designated, i.e. if the process proceeds to the step S5005, the CPU 402 calculates the number of output sheets per one copy, and the process proceeds to a step S5006. When the images of two pages are laid out in one page as shown in FIGS. 14A to 14C, the number of output sheets per one copy is calculated by a calculation formula of (total number of pages+3)/4.

In the step S5006, the CPU 402 determines whether or not the number of output sheets per one copy is larger than a saddle-stitchable number of sheets by the finisher 315. If it is determined that the number of output sheets per one copy is larger than the saddle-stitchable number, the process proceeds to a step S5018 in FIG. 22B, whereas if not, the process proceeds to a step S5007.

In the step S5007, the CPU 402 determines that the discharge destination is the saddle-stitched product tray 331, and the process proceeds to a step S5008.

In the step S5008, the CPU 402 determines whether or not attachment of the front cover is designated. If it is determined that attachment of the front cover is designated, the process proceeds to a step S5009, whereas if not, the process proceeds to a step S5010.

In the step S5009, the CPU 402 lays out pages in a manner shown in FIGS. 19A to 19C, and the process proceeds to a step S5011.

In the step S5011, the CPU 402 performs image formation processing on the sheets corresponding to the body, and the process proceeds to a step S5012.

In the step S5012, the CPU 402 causes the conveying roller pairs 37 and 38 to switch back each of sheets corresponding to the body, and then causes the sheets to be sequentially accumulated within the conveying path 41.

In a step S5013, the CPU 402 performs image formation processing on a sheet corresponding to the front cover, and the process proceeds to a step S5014.

In the step S5014, the CPU 402 causes the conveying roller pairs 37 and 38 to switch back the sheet corresponding to the front cover, and then causes the sheet to be accumulated within the conveying path 41.

In a step S5015, after causing stapling of the sheet bundle accumulated in the conveying path 41 to be performed, the CPU 402 causes folding of the same to be performed and causes the sheet bundle to be discharged onto the saddle-stitched product tray 331.

On the other hand, if the process proceeds to the step S5010, the CPU 402 lays out pages in a manner shown in FIGS. 14A to 14C, and the process proceeds to a step S5016. In the step S5016, the CPU 402 performs image formation processing on the sheets corresponding to the body, and the process proceeds to a step S5017.

In the step S5017, after causing the conveying roller pairs 37 and 38 to switch back each of sheets corresponding to the body, the CPU 402 causes the sheets to be sequentially accumulated within the conveying path 41, and the process proceeds to the step S5015.

Figure 22B:
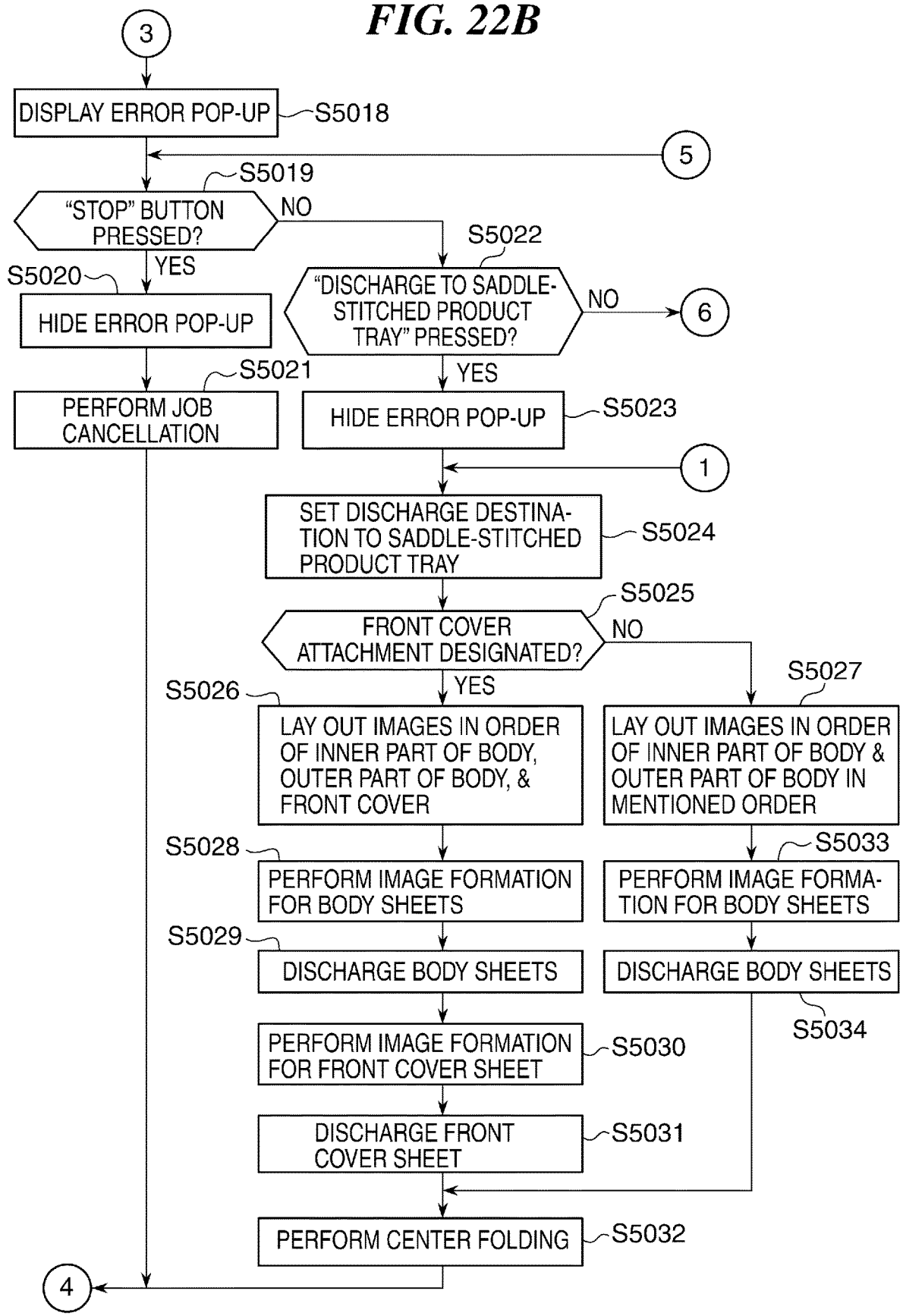
FIG. 22B is a continuation of FIG. 22A.

On the other hand, if it is determined in the step S5006 that the number of output sheets per one copy is larger than the saddle-stitchable number of sheets by the finisher 315 and the process proceeds to the step S5018 in FIG. 22B, the CPU 402 causes the processing to be interrupted and the error pop-up shown in FIG. 12 to be displayed on the display section 505, whereafter the process proceeds to a step S5019. In the step S5019, the CPU 402 determines whether or not the "stop" button 1201 on the error pop-up shown in FIG. 12 is pressed. If it is determined that the "stop" button 1201 is pressed, the process proceeds to a step S5020, whereas if not, the process proceeds to a step S5022.

In the step S5020, the CPU 402 causes the error pop-up shown in FIG. 12 to be hidden, and the process proceeds to a step S5021.

In the step S5021, the CPU 402 executes processing for forcibly terminating the job, followed by terminating the present process.

On the other hand, if it is determined in the step S5019 that the "stop" button 1201 is not pressed, the process proceeds to the step S5022, wherein the CPU 402 determines whether or not the "discharge to processing tray" button 1202 on the error pop-up shown in FIG. 12 is pressed. If it is determined that the "discharge to processing tray" button 1202 is pressed, the process proceeds to a step S5023, whereas if not, the process proceeds to a step S5035 in FIG. 22C.

In the step S5023, the CPU 402 causes the error pop-up shown in FIG. 12 to be hidden, and the process proceeds to the step S5024.

In the step S5024, the CPU 402 determines that the discharge destination is the saddle-stitched product tray 331, and the process proceeds to a step S5025.

In the step S5025, the CPU 402 determines whether or not attachment of the front cover is designated. If it is determined that attachment of the front cover is designated, the process proceeds to a step S5026, whereas if not, the process proceeds to a step S5027.

In the step S5026, the CPU 402 lays out pages in a manner shown in FIGS. 20, 21A, and 21B, and the process proceeds to a step S5028.

In the step S5028, the CPU 402 performs image formation processing on the sheets corresponding to the body, and the process proceeds to a step S5029.

In the step S5029, the CPU 402 causes the conveying roller pairs 37 and 38 to switch back each of the sheets corresponding to the body, and then causes the sheets to be sequentially accumulated within the conveying path 41.

In a step S5030, the CPU 402 performs image formation processing on the sheet corresponding to the front cover, and the process proceeds to a step S5031.

In the step S5031, the CPU 402 causes the conveying roller pairs 37 and 38 to switch back the sheet corresponding to the front cover, and then causes the sheet to be accumulated within the conveying path 41.

In the following step S5032, the CPU 402 causes folding of each bundle of five sheets accumulated in the conveying path 41 to be folded, and causes the bundle to be discharged onto the saddle-stitched product tray 331. Note that processing from the step S5028 to the step S5032 is illustrated in a simplified manner. In actuality, whenever five sheets on which image formation has been performed, including the front cover, are discharged and accumulated within the conveying path 41, folding of the bundle of the five sheets is executed in the step S5032. Therefore, as for up to the second last bundle of five sheets, the steps S5028, S5029, and S5032 are executed in the mentioned order, and as for the last bundle of not more than five sheets including the front cover, the steps S5030, S5031, and S5032 are executed in the mentioned order after the steps S5028 and S5029 are executed, as required.

On the other hand, if it is determined in the step S5025 that attachment of the front cover is not designated and the process proceeds to the step S5027, the CPU 402 lays out pages in a manner shown in FIGS. 15, 16A, and 16B, and the process proceeds to a step S5033. In the step S5033, the CPU 402 performs image formation processing on the sheets corresponding to the body, and the process proceeds to a step S5034.

In the step S5034, after causing the conveying roller pairs 37 and 38 to switch back each of the sheets corresponding to the body, the CPU 402 causes the sheets to be sequentially accumulated within the conveying path 41, and whenever each bundle of five sheets are accumulated within the conveying path 41, the process proceeds to the step S5032.

Figure 22C:
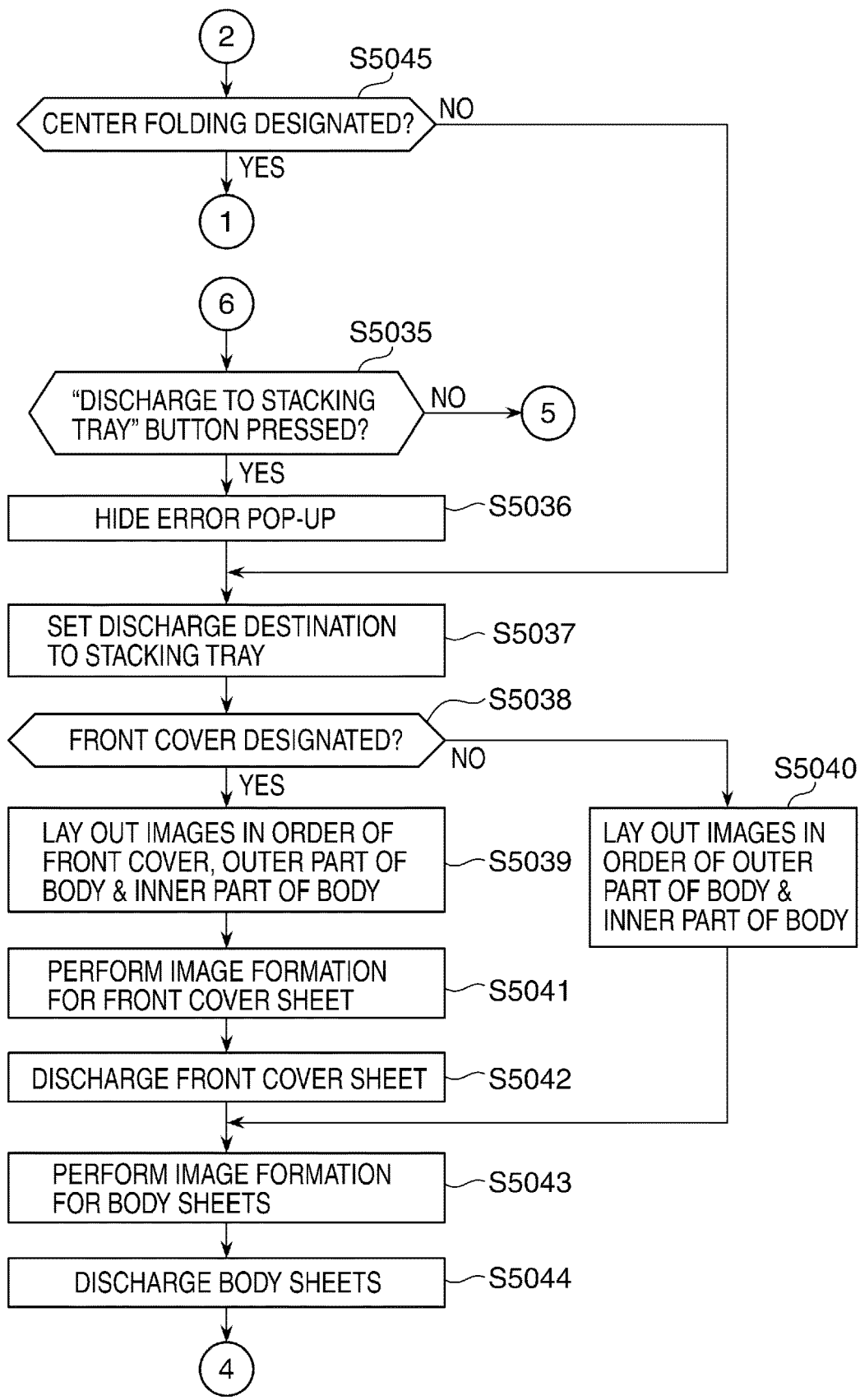
FIG. 22C is a continuation of FIG. 22A.
Figure 23:
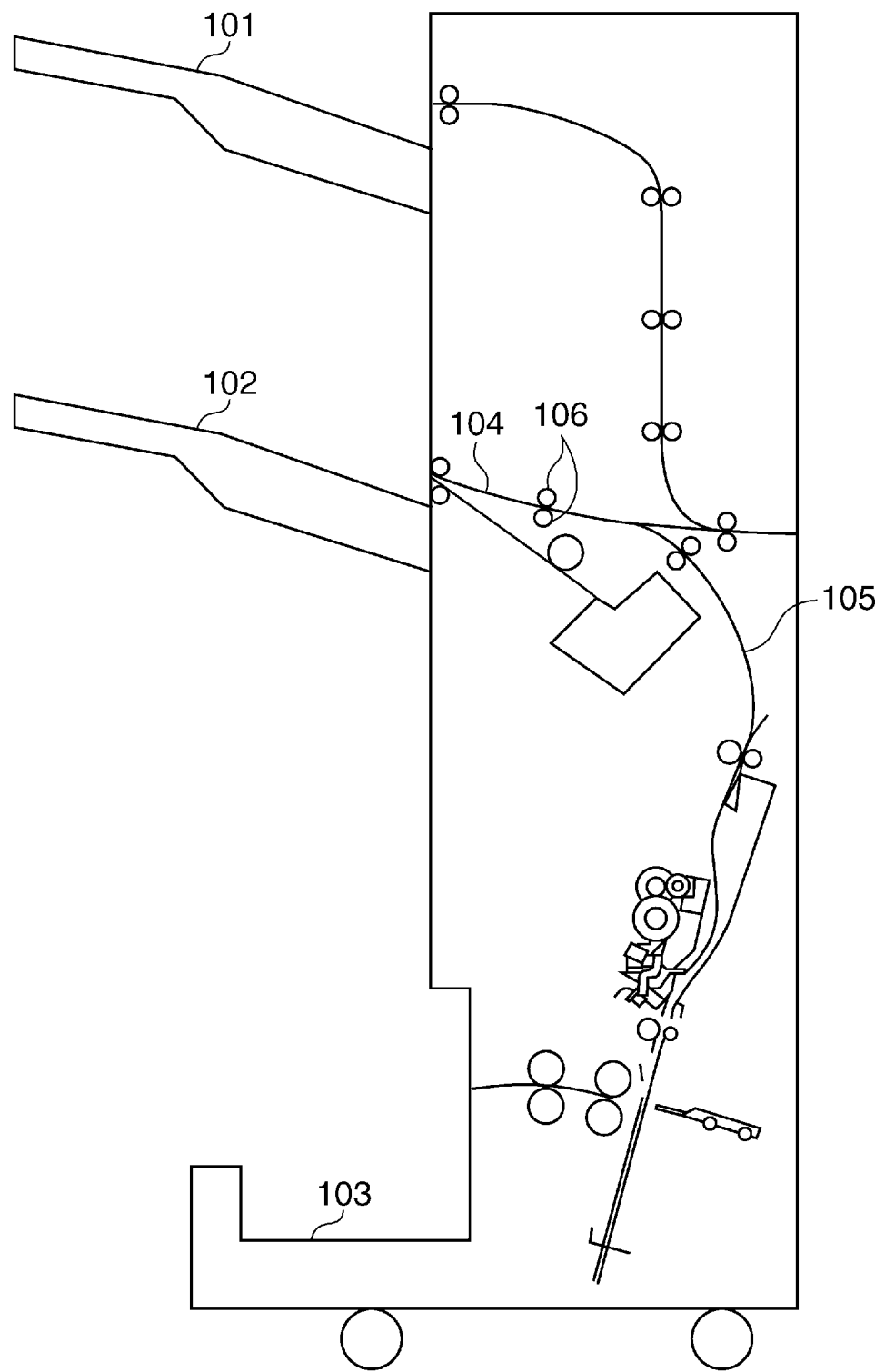
FIG. 23 is a schematic diagram of a conventional finisher.

On the other hand, if it is determined in the step S5022 that the "discharge to processing tray" button 1202 is not pressed and the process proceeds to the step S5035 in FIG. 22C, the CPU 402 determines whether or not the "discharge to stacking tray" button 1203 on the error pop-up shown in FIG. 12 is pressed. If it is determined that the "discharge to stacking tray" button 1203 is pressed, the process proceeds to a step S5036, whereas if not, the process returns to the step S5019. In the step S5036, the CPU 402 causes the error pop-up shown in FIG. 12 to be hidden, and the process proceeds to the step S5037.

In the step S5037, the CPU 402 determines that the discharge destination is the stacking tray 328, and the process proceeds to a step S5038.

In the step S5038, the CPU 402 determines whether or not attachment of the front cover is designated. If it is determined that attachment of the front cover is designated, the process proceeds to a step S5039, whereas if not, the process proceeds to a step S5040.

In the step S5039, the CPU 402 lays out pages in a manner shown in FIGS. 18A and 18B, and the process proceeds to a step S5041.

In the step S5041, the CPU 402 performs image formation processing on the sheet corresponding to the front cover, and the process proceeds to a step S5042.

In the step S5042, the CPU 402 causes the conveying roller pairs to discharge the sheet corresponding to the front cover without performing stapling or folding, and the process proceeds to a step S5043. In this case, the front cover is discharged not onto the saddle-stitched product tray 331, but onto the stacking tray 328.

On the other hand, if the process proceeds to the step S5040, the CPU 402 lays out pages in a manner shown in FIGS. 13A and 13B, and the process proceeds to the step S5043. In the step S5043, the CPU 402 performs image formation processing on the sheets corresponding to the body, and proceeds to a step S5044.

In the step S5044, the CPU 402 causes the conveying roller pairs to discharge each of the sheets corresponding to the body onto the stacking tray 328 without performing stapling or folding.

The described-above control of the order of image formation provides the following advantageous effects: In the case where the number of output sheets per one copy is larger than the number of sheets that can be saddle-stitched by the sheet processing apparatus equipped with the switch-back mechanism, the user can flexibly select whether to stop printing, or cancel only stapling, or cancel both stapling and folding, as intended by the user.

Further, in both cases where only stapling is canceled and where both stapling and folding are canceled, it is possible to obtain a product having the optimum image layout, which improves the convenience of the user.

Although the description has been given of the case where the saddle-stitchable number of sheets by the finisher 315 is twenty-five, the saddle-stitchable number is not limited to twenty-five.

Further, although in the above-described embodiment, the description has been given of the case where folding is performed on each bundle of five sheets, and the bundle of five sheets is discharged onto the saddle-stitched product tray 331, the number of sheets processed at a time is not limited to five.

Further, although in the above-described embodiment, the description has been given of the method of laying out original images on respective pages for producing a left-opening bookbound product, the bookbound product to be produced is not limited to the left-opening bookbound product.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and performing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076178 filed Apr. 2, 2014, which is hereby incorporated by reference herein in its entirety.

What is claimed is:

1. A printing apparatus that is connectable to a post-processing apparatus capable of performing a saddle-stitching process, the printing apparatus comprising:
an image forming device configured to form images on a plurality of recording sheets including a cover sheet and a body sheet; and
a controller configured to control the image forming device and the post-processing apparatus,
wherein the controller is configured:
to receive a job for forming the images on the plurality of recording sheets and for performing the saddle-stitching process on the plurality of recording sheets;
in a case in which the job is received, to determine whether or not the number of the plurality of recording sheets is larger than a predetermined number of sheets which can be subjected to the saddle-stitching process;
in a case in which it is determined that the number of the plurality of recording sheets is not larger than the predetermined number, to control an image forming order on the plurality of recording sheets so that image formation on the cover sheet is performed lastly, and to control the post-processing apparatus to perform the saddle-stitching process on the plurality of recording sheets;
in a case in which it is determined that the number of the plurality of recording sheets is larger than the predetermined number, to cause a console section to display a plurality of options including a first option and a second option;
in a case in which the first option is selected from among the plurality of options, to control the image forming order on the plurality of recording sheets so that image formation on the cover sheet is performed firstly, and to control the post-processing apparatus such that the plurality of recording sheets are discharged without the saddle-stitching process being performed; and
in a case in which the second option is selected from among the plurality of options, to cancel the job.

2. The printing apparatus according to claim 1, wherein the saddle-stitching process includes a binding process and a folding process.

3. The printing apparatus according to claim 1, further comprising a reading device configured to read one or more images on an original,
wherein the image forming device is configured to form the one or more images, which were read by the reading device, on one or more recording sheets.

4. The printing apparatus according to claim 3, wherein the controller is configured to calculate the number of the plurality of recording sheets based on a number of pages of the original read by the reading device.

5. The printing apparatus according to claim 1, wherein the image forming device is configured to form images on both sides of a recording sheet.

6. The printing apparatus according to claim 1, further comprising a conveying portion configured to convey to convey the plurality of recording sheets, on which the images are formed by the image forming device, to the post-processing apparatus.

7. The printing apparatus according to claim 1, wherein the controller is configured to arrange the images according to a bookbinding layout and to control the image forming device to form the arranged images on the plurality of recording sheets.

8. The printing apparatus according to claim 1, wherein the cover sheet is a sheet corresponding to an outermost recording sheet when the plurality of recording sheets are folded.

9. The printing apparatus according to claim 1, wherein a type of the cover sheet is different from a type of the body sheet.

10. The printing apparatus according to claim 1, wherein a size of the cover sheet is the same as a size of the body sheet.

11. The printing apparatus according to claim 1, wherein a cover printing setting for printing an image on the cover sheet is received via the console section.

12. The printing apparatus according to claim 1, wherein the predetermined number of sheets is a maximum number of sheets on which the saddle-stitching process is capable of being performed.

13. A method of controlling a printing apparatus that is connectable to a post-processing apparatus capable of performing a saddle-stitching process, the method comprising:
    making a first determination, performed at least in part by a controller of the printing apparatus, that the number of a first plurality of recording sheets is not larger than a predetermined number of sheets which can be subjected to the saddle-stitching process, the first plurality of recording sheets including a cover sheet and a body sheet;
    controlling, performed at least in part by the controller of the printing apparatus and in response to making the first determination that the number of the first plurality of recording sheets is not larger than the predetermined number:
        (a) an image forming device of the printing apparatus to execute a first image forming order on the first plurality of recording sheets so that image formation on the cover sheet of the first plurality of recording sheets is performed lastly, and
        (b) the post-processing apparatus to perform the saddle-stitching process on the first plurality of recording sheets;
    making a second determination, performed at least in part by the controller of the printing apparatus, that the number of a second plurality of recording sheets is larger than the predetermined number, the second plurality of recording sheets including a cover sheet and a body sheet;
    causing, performed at least in part by the controller of the printing apparatus and in response to making the second determination that the number of the second plurality of recording sheets is larger than the predetermined number, a console section to produce a first display of a plurality of options including a first option and a second option;
    controlling, performed at least in part by the controller of the printing apparatus and in response to a selection of the first option from among the plurality of options of the first display:
        (c) the image forming device of the printing apparatus to execute a second image forming order on the second plurality of recording sheets so that image formation on the cover sheet of the second plurality of recording sheets is performed firstly, and
        (d) the post-processing apparatus such that the second plurality of recording sheets are discharged without the saddle-stitching process being performed;
    receiving a job for forming images on a third plurality of recording sheets and for performing the saddle-stitching process on the third plurality of recording sheets;
    making a third determination, performed at least in part by the controller of the printing apparatus, that the number of the third plurality of recording sheets is larger than the predetermined number;
    causing, performed at least in part by the controller of the printing apparatus and in response to making the third determination that the number of the third plurality of recording sheets is larger than the predetermined number, the console section to produce a second display of the plurality of options including the first option and the second option; and
    controlling, performed at least in part by the controller of the printing apparatus and in response to a selection of the second option from among the plurality of options of the second display, to cancel the job.

14. A non-transitory computer-readable storage medium storing a computer-executable program for executing a method of controlling a printing apparatus that is connectable to a post-processing apparatus capable of performing a saddle-stitching process, the method comprising:
    making a first determination, performed at least in part by a controller of the printing apparatus, that the number of a first plurality of recording sheets is not larger than a predetermined number of sheets which can be subjected to the saddle-stitching process, the first plurality of recording sheets including a cover sheet and a body sheet;
    controlling, performed at least in part by the controller of the printing apparatus and in response to making the first determination that the number of the first plurality of recording sheets is not larger than the predetermined number:
        (a) an image forming device of the printing apparatus to execute a first image forming order on the first plurality of recording sheets so that image formation on the cover sheet of the first plurality of recording sheets is performed lastly, and
        (b) the post-processing apparatus to perform the saddle-stitching process on the first plurality of recording sheets;
    making a second determination, performed at least in part by the controller of the printing apparatus, that the number of a second plurality of recording sheets is larger than the predetermined number, the second plurality of recording sheets including a cover sheet and a body sheet;
    causing, performed at least in part by the controller of the printing apparatus and in response to making the second determination that the number of the second plurality of recording sheets is larger than the predetermined number, a console section to produce a first display of a plurality of options including a first option and a second option;
    controlling, performed at least in part by the controller of the printing apparatus and in response to a selection of the first option from among the plurality of options of the first display:
        (c) the image forming device of the printing apparatus to execute a second image forming order on the second plurality of recording sheets so that image formation on the cover sheet of the second plurality of recording sheets is performed firstly, and
        (d) the post-processing apparatus such that the second plurality of recording sheets are discharged without the saddle-stitching process being performed;
    receiving a job for forming images on a third plurality of recording sheets and for performing the saddle-stitching process on the third plurality of recording sheets;
    making a third determination, performed at least in part by the controller of the printing apparatus, that the number of the third plurality of recording sheets is larger than the predetermined number;
    causing, performed at least in part by the controller of the printing apparatus and in response to making the third determination that the number of the third plurality of recording sheets is larger than the predetermined number, the console section to produce a second display of the plurality of options including the first option and the second option; and
    controlling, performed at least in part by the controller of the printing apparatus and in response to a selection of the second option from among the plurality of options of the second display, to cancel the job.

* * * * *